United States Patent
Biamonte et al.

(10) Patent No.: US 11,816,536 B2
(45) Date of Patent: Nov. 14, 2023

(54) PHYSICAL REALIZATIONS OF A UNIVERSAL ADIABATIC QUANTUM COMPUTER

(71) Applicant: D-WAVE SYSTEMS INC., Burnaby (CA)

(72) Inventors: Jacob Daniel Biamonte, Burnaby (CA); Andrew J. Berkley, Vancouver (CA); Mohammad H. S. Amin, Burnaby (CA)

(73) Assignee: 1372934 B.C. LTD, Burnaby (CA)

( * ) Notice: Subject to any disclaimer, the term of this patent is extended or adjusted under 35 U.S.C. 154(b) by 528 days.

(21) Appl. No.: 17/113,847

(22) Filed: Dec. 7, 2020

(65) Prior Publication Data

US 2021/0374590 A1    Dec. 2, 2021

Related U.S. Application Data

(60) Continuation of application No. 15/962,729, filed on Apr. 25, 2018, now Pat. No. 10,885,459, which is a continuation of application No. 14/860,087, filed on Sep. 21, 2015, now Pat. No. 9,984,333, which is a continuation of application No. 13/539,039, filed on Jun. 29, 2012, now Pat. No. 9,162,881, which is a division of application No. 12/098,348, filed on Apr. 4, 2008, now Pat. No. 8,234,103.

(60) Provisional application No. 60/910,445, filed on Apr. 5, 2007.

(51) Int. Cl.
*G06N 10/00*    (2022.01)
*B82Y 10/00*    (2011.01)
*G06N 99/00*    (2019.01)

(52) U.S. Cl.
CPC .............. *G06N 10/00* (2019.01); *B82Y 10/00* (2013.01); *G06N 99/00* (2013.01); *Y10S 977/933* (2013.01)

(58) Field of Classification Search
CPC ...................................................... G06N 10/00
USPC ................................................. 712/1; 706/45
See application file for complete search history.

(56) References Cited

U.S. PATENT DOCUMENTS

| 4,280,095 A | 7/1981 | Hinton |
| 4,370,359 A | 1/1983 | Fetter et al. |
| 4,371,796 A | 2/1983 | Takada |
| 4,496,854 A | 1/1985 | Chi et al. |

(Continued)

FOREIGN PATENT DOCUMENTS

| CA | 2386426 A1 | 5/2001 |
| CA | 2814865 A1 | 5/2012 |

(Continued)

OTHER PUBLICATIONS

Steffen, A Prototype Quantum Computer Using Nuclear Spins in Liquid Solution, Doctoral Thesis, Stanford University, Jun. 2003, pp. 1-370 (Year: 2003).*

(Continued)

*Primary Examiner* — Wilbert L Starks
(74) *Attorney, Agent, or Firm* — Cozen O'Connor

(57) ABSTRACT

Devices, methods and articles advantageously allow communications between qubits to provide an architecture for universal adiabatic quantum computation. The architecture includes a first coupled basis $A_1B_1$ and a second coupled basis $A_2B_2$ that does not commute with the first basis $A_1B_1$.

20 Claims, 10 Drawing Sheets

(56) References Cited

U.S. PATENT DOCUMENTS

| | | |
|---|---|---|
| 5,095,357 A | 3/1992 | Andoh et al. |
| 5,110,793 A | 5/1992 | De |
| 5,157,466 A | 10/1992 | Char et al. |
| 5,323,344 A | 6/1994 | Katayama et al. |
| 5,465,049 A | 11/1995 | Matsuura et al. |
| 5,523,914 A | 6/1996 | Weck et al. |
| 5,917,322 A | 6/1999 | Gershenfeld et al. |
| 5,962,781 A | 10/1999 | Veryaskin |
| 6,037,649 A | 3/2000 | Liou |
| 6,058,127 A | 5/2000 | Joannopoulos et al. |
| 6,389,197 B1 | 5/2002 | Iltchenko et al. |
| 6,437,413 B1 | 8/2002 | Yamaguchi et al. |
| 6,459,097 B1 | 10/2002 | Zagoskin |
| 6,495,854 B1 | 12/2002 | Newns et al. |
| 6,504,172 B2 | 1/2003 | Zagoskin et al. |
| 6,563,311 B2 | 5/2003 | Zagoskin |
| 6,597,010 B2 | 7/2003 | Eriksson et al. |
| 6,605,822 B1 | 8/2003 | Blais et al. |
| 6,627,915 B1 | 9/2003 | Ustinov et al. |
| 6,627,916 B2 | 9/2003 | Amin et al. |
| 6,670,630 B2 | 12/2003 | Blais et al. |
| 6,753,546 B2 | 6/2004 | Tzalenchuk et al. |
| 6,784,451 B2 | 8/2004 | Amin et al. |
| 6,791,109 B2 | 9/2004 | Tzalenchuk et al. |
| 6,803,599 B2 | 10/2004 | Amin et al. |
| 6,822,255 B2 | 11/2004 | Tzalenchuk et al. |
| 6,838,694 B2 | 1/2005 | Esteve et al. |
| 6,885,325 B2 | 4/2005 | Omelyanchouk et al. |
| 6,897,468 B2 | 5/2005 | Blais et al. |
| 6,936,841 B2 | 8/2005 | Amin et al. |
| 6,960,780 B2 | 11/2005 | Blais et al. |
| 6,979,836 B2 | 12/2005 | Zagoskin et al. |
| 6,984,846 B2 | 1/2006 | Newns et al. |
| 6,987,282 B2 | 1/2006 | Amin et al. |
| 6,996,504 B2 | 2/2006 | Novotny et al. |
| 7,002,174 B2 | 2/2006 | Il et al. |
| 7,015,499 B1 | 3/2006 | Zagoskin |
| 7,109,593 B2 | 9/2006 | Freedman et al. |
| 7,135,701 B2 | 11/2006 | Amin et al. |
| 7,253,654 B2 | 8/2007 | Amin |
| 7,277,872 B2 | 10/2007 | Raussendorf et al. |
| 7,335,909 B2 | 2/2008 | Amin et al. |
| 7,364,923 B2 | 4/2008 | Lidar et al. |
| 7,418,283 B2 | 8/2008 | Amin |
| 7,533,068 B2 | 5/2009 | Maassen et al. |
| 7,605,600 B2 | 10/2009 | Harris |
| 7,619,437 B2 | 11/2009 | Thom et al. |
| 7,639,035 B2 | 12/2009 | Berkley |
| 7,788,192 B2 | 8/2010 | Amin |
| 7,800,395 B2 | 9/2010 | Johnson et al. |
| 7,843,209 B2 | 11/2010 | Berkley |
| 7,847,615 B2 | 12/2010 | Yorozu et al. |
| 7,876,248 B2 | 1/2011 | Berkley et al. |
| 7,880,529 B2 | 2/2011 | Amin |
| 7,898,282 B2 | 3/2011 | Harris et al. |
| 8,008,942 B2 | 8/2011 | Van et al. |
| 8,018,244 B2 | 9/2011 | Berkley |
| 8,022,722 B1 | 9/2011 | Pesetski et al. |
| 8,035,540 B2 | 10/2011 | Berkley et al. |
| 8,063,657 B2 | 11/2011 | Rose |
| 8,073,808 B2 | 12/2011 | Rose |
| 8,098,179 B2 | 1/2012 | Bunyk et al. |
| 8,164,082 B2 | 4/2012 | Friesen |
| 8,169,231 B2 | 5/2012 | Berkley |
| 8,174,305 B2 | 5/2012 | Harris |
| 8,190,548 B2 | 5/2012 | Choi |
| 8,190,553 B2 | 5/2012 | Routt |
| 8,195,596 B2 | 6/2012 | Rose et al. |
| 8,234,103 B2 | 7/2012 | Biamonte et al. |
| 8,283,943 B2 | 10/2012 | Van Den Brink et al. |
| 8,421,053 B2 | 4/2013 | Bunyk et al. |
| 8,504,497 B2 | 8/2013 | Amin |
| 8,536,566 B2 | 9/2013 | Johansson et al. |
| 8,686,751 B2 | 4/2014 | Van Den Brink et al. |
| 8,772,759 B2 | 7/2014 | Bunyk et al. |
| 8,786,476 B2 | 7/2014 | Bunyk et al. |
| 8,854,074 B2 | 10/2014 | Berkley |
| 9,015,215 B2 | 4/2015 | Berkley et al. |
| 9,059,674 B2 | 6/2015 | Chow et al. |
| 9,069,928 B2 | 6/2015 | Van Den Brink et al. |
| 9,129,224 B2 | 9/2015 | Lanting et al. |
| 9,162,881 B2 | 10/2015 | Biamonte et al. |
| 9,806,711 B1 | 10/2017 | Abdo |
| 10,074,792 B1 | 9/2018 | Ferguson et al. |
| 2002/0117656 A1 | 8/2002 | Amin et al. |
| 2002/0121636 A1 | 9/2002 | Amin et al. |
| 2002/0188578 A1 | 12/2002 | Amin et al. |
| 2002/0190381 A1 | 12/2002 | Herr et al. |
| 2003/0027724 A1 | 2/2003 | Rose et al. |
| 2003/0055513 A1 | 3/2003 | Raussendorf et al. |
| 2003/0071258 A1 | 4/2003 | Zagoskin et al. |
| 2003/0107033 A1 | 6/2003 | Tzalenchuk et al. |
| 2003/0121028 A1 | 6/2003 | Coury et al. |
| 2003/0169041 A1 | 9/2003 | Coury et al. |
| 2003/0173498 A1 | 9/2003 | Blais et al. |
| 2003/0224753 A1 | 12/2003 | Bremond et al. |
| 2004/0000666 A1 | 1/2004 | Lidar et al. |
| 2004/0012407 A1 | 1/2004 | Amin et al. |
| 2004/0016918 A1 | 1/2004 | Amin et al. |
| 2004/0077503 A1 | 4/2004 | Blais et al. |
| 2004/0078421 A1 | 4/2004 | Routt |
| 2004/0119061 A1 | 6/2004 | Wu et al. |
| 2004/0140537 A1 | 7/2004 | Il et al. |
| 2004/0173792 A1 | 9/2004 | Blais et al. |
| 2004/0238813 A1 | 12/2004 | Lidar et al. |
| 2005/0001209 A1 | 1/2005 | Hilton et al. |
| 2005/0062072 A1 | 3/2005 | Yamamoto et al. |
| 2005/0082519 A1 | 4/2005 | Amin et al. |
| 2005/0127915 A1 | 6/2005 | Schauwecker et al. |
| 2005/0140019 A1 | 6/2005 | Watanabe |
| 2005/0224784 A1 | 10/2005 | Amin et al. |
| 2005/0250651 A1 | 11/2005 | Amin et al. |
| 2005/0256007 A1 | 11/2005 | Amin et al. |
| 2006/0043541 A1 | 3/2006 | Tetelbaum |
| 2006/0097746 A1 | 5/2006 | Amin |
| 2006/0097747 A1 | 5/2006 | Amin |
| 2006/0147154 A1 | 7/2006 | Thom et al. |
| 2006/0225165 A1 | 10/2006 | Maassen et al. |
| 2007/0180586 A1 | 8/2007 | Amin |
| 2007/0212889 A1 | 9/2007 | Abatchev et al. |
| 2008/0052055 A1 | 2/2008 | Rose et al. |
| 2008/0176750 A1 | 7/2008 | Rose et al. |
| 2008/0238531 A1 | 10/2008 | Harris |
| 2008/0258753 A1 | 10/2008 | Harris |
| 2009/0070402 A1 | 3/2009 | Rose et al. |
| 2009/0078932 A1 | 3/2009 | Amin |
| 2009/0121215 A1 | 5/2009 | Choi |
| 2009/0153180 A1 | 6/2009 | Herr |
| 2010/0182039 A1 | 7/2010 | Baumgardner et al. |
| 2011/0057169 A1 | 3/2011 | Harris et al. |
| 2011/0060780 A1 | 3/2011 | Berkley et al. |
| 2012/0278057 A1 | 11/2012 | Biamonte et al. |
| 2013/0005580 A1 | 1/2013 | Bunyk et al. |
| 2013/0278283 A1 | 10/2013 | Berkley |
| 2014/0097405 A1 | 4/2014 | Bunyk |
| 2014/0228222 A1 | 8/2014 | Berkley et al. |
| 2014/0266406 A1 | 9/2014 | Abraham et al. |
| 2014/0337612 A1 | 11/2014 | Williams |
| 2014/0345251 A1 | 11/2014 | McLean et al. |
| 2015/0032991 A1 | 1/2015 | Lanting et al. |
| 2015/0032994 A1 | 1/2015 | Chudak et al. |
| 2015/0046681 A1 | 2/2015 | King |
| 2016/0267032 A1 | 9/2016 | Rigetti et al. |
| 2016/0314407 A1 | 10/2016 | Bunyk et al. |
| 2016/0335558 A1 | 11/2016 | Bunyk et al. |
| 2017/0047161 A1 | 2/2017 | Ludois et al. |
| 2017/0344898 A1 | 11/2017 | Karimi et al. |
| 2018/0145631 A1 | 5/2018 | Berkley et al. |
| 2019/0393401 A1 | 12/2019 | Megrant |

FOREIGN PATENT DOCUMENTS

| | | |
|---|---|---|
| CN | 101868802 A | 10/2010 |
| JP | 2005142348 A | 6/2005 |

(56) References Cited

FOREIGN PATENT DOCUMENTS

| | | | |
|---|---|---|---|
| JP | 2007250771 A | 9/2007 | |
| JP | 2009065017 A | 3/2009 | |
| JP | 2010524064 A | 7/2010 | |
| JP | 2011524043 A | 8/2011 | |
| JP | 2011197875 A | 10/2011 | |
| JP | 2012064974 A | 3/2012 | |
| JP | 6140679 B2 | 5/2017 | |
| JP | 2020524064 A | 8/2020 | |
| WO | 0227653 A2 | 4/2002 | |
| WO | 2004077600 A1 | 9/2004 | |
| WO | 2004102470 A2 | 11/2004 | |
| WO | 2005093649 A1 | 10/2005 | |
| WO | 2006024939 A2 | 3/2006 | |
| WO | 2009120638 A2 | 10/2009 | |
| WO | 2012064974 A2 | 5/2012 | |
| WO | 2014197001 A1 | 12/2014 | |
| WO | 2015103372 A1 | 7/2015 | |

OTHER PUBLICATIONS

Ithier, Manipulation, readout and analysis of the decoherence ofa superconducting quantum bit, Doctoral Thesis, l'Universite Paris VI, Feb. 12, 2007, pp. 1-201 (Year: 2007).*
Blais, et al., Cavity quantum electrodynamics for superconducting electrical circuits: an architecture for quantum computation, arXiv:cond-mat/0402216 v1, Feb. 7, 2004, pp. 1-14 (Year: 2004).*
Nunn, Quantum Memory in Atomic Ensembles, Doctoral Thesis, Clarendon Laboratory, University of Oxford, 2008, pp. 1-524 (Year: 2008).*
"A High-Level Look at Optimization: Past, Present and Future," e-Optimization.Community, May 2000, pp. 1-5.
Aaronson, "Thanksgiving Special: D-Wave at MIT," Shtetl-Optimized—the Blog of Scott Aaronson, URL=http://www.scottaaronson.com/blog/?p=291, retrieved Apr. 14, 2011 (originally retrieved Nov. 28, 2007), 54 pages.
Abelson et al., "Superconductor Integrates Circuit Fabrication Technology", IEEE Invited Paper, Oct. 10, 2004. https://ieeexplore.ieee.org/document/1335546.
Albash et al., "Simulated Quantum Annealing with Two All-to-All Connectivity Schemes", arXiv:1603.03755v1 [quant-ph], Mar. 11, 2016. https://arxiv.org/abs/1603.03755.
Almasi et al., "Blue Gene: a vision for protein science using a petaflop supercomputer", IBM Systems Journal, 2001. https://ieeexplore.ieee.org/document/5386970.
Al-Saidi et al., "Several small Josephson junctions in a resonant cavity: Deviation from the Dicke model", Physical Review B, Jun. 5, 2002.
Amin et al., "Decoherence in adiabatic quantum computation", arXiv:0708.0384, Aug. 2, 2007. https://arxiv.org/abs/0708.0384.
Amin et al., "Probing Noise in Superconducinting Flux Qubits Using Macroscopic Resonant Tunneling" Sep. 1, 2007.
Barenco et al., "Elementary gates for quantum computation," Physical Review A 52(5):3457-3467, Nov. 1995.
Barends R. et al., "Coherent Josephson qubit suitable for scalable quantum integrated circuits," arXiv:1304.2322v1 [quant-ph], Apr. 8, 2013, 10 pages.
Berggren, "Quantum Computing With Superconductors", Proceedings of the IEEE, Oct. 1, 2004. https://www.researchgate.net/publication/2986358_Quantum_Computing_with_Superconductors.
Berkley et al., "Entangled Macroscopic Quantum States in Two Superconducting Qubits", Science, Jun. 6, 2003. https://science.sciencemag.org/content/300/5625/1548.
Berkley, "Methods of Ferromagnetic and Adiabatic Classical Qubit State Copying", U.S. Appl. No. 60/675,139, filed Apr. 26, 2005, 45 pages.
Blais et al., "Operation of universal gates in a solid-state quantum computer based on clean Josephson junctions between d-wave superconductors", Physical Review A, 61, 042308, 2000.
Bryant et al., "Introduction to Electronic Analogue Computing," Physics& Mathematics, AEC Research and Development Report, pp. 2-50, Aug. 1966.
Buisson et al., "Entangled states in a Josephson charge qubit coupled to a superconducting resonator", arXiv.org:cond/mat/0008275 (2000).
Carelli et al., "SQUID Systems for Macroscopic Quantum Coherence and Quantum Computing", IEEE trans. Apple. Supercond., Mar. 1, 2001. https://ieeexplore.ieee.org/document/919321.
Chancellor et al., "A Direct Mapping of Max k-SAT and High Order Parity Checks to a Chimera Graph", Nature Magazine, Nov. 8, 2016. https://www.nature.com/articles/srep37107.
Chancellor et al., "Circuit design for multi-body interactions in superconducting quantum annealing systems with applications to a scalable architecture", Nature Magazine, Aug. 1, 2016. https://www.nature.com/articles/s41534-017-0022-6.
Chancellor et al., "Experimental Freezing of mid-Evolution Fluctuations with a Programmable Annealer", arXiv:1605.07549 [quant-ph], May 24, 2016. https://arxiv.org/abs/1605.07549.
Chen et al., "Qubit architecture with high coherences and fast tunable coupling", Physical Review Letters, Feb. 28, 2014. https://arxiv.org/abs/1402.7367.
Choudhury, "Handbook of Microlithography, Micromachining and Microfabrication vol. 1: Microlithography", The International Society for Optical Engineering, Bellingham, WA, 1999. (book details provided).
Clarke et al., "Superconducting quantum bits," Nature 453:1031-1042, Jun. 19, 2008.
Cormen et al., Introduction to Algorithms, The MIT Press, Cambridge, Massachusetts, pp. 964-985, 2000.
Devoret et al., "Superconducting Circuits for Quantum Information: an Outlook," Science 339:1169-1174, Mar. 8, 2013.
Devoret et al., "Superconducting Qubits: a Short Review," arXiv:cond-mat/0411174v1, Nov. 7, 2004, 41 pages.
DiVincenzo, "The Physical Implementation of Quantum Computation," Fortschr. Phys. 48:771-783, 2000.
Dolan et al., "Optimization on the NEOS Server," from SIAM News 35(6): 1-5, Jul./Aug. 2002.
Dolan, "Offset masks for lift-off photoprocessing", Applied Physics Letters, Aug. 26, 2008. https://aip.scitation.org/doi/10.1063/1.89690.
Dos Santos, R., "Introduction to Quantum Monte Carlo Simulations for Fermionic Systems," arXiv:cond-mat/0303551v1 [cond-mat-str-el], Mar. 26, 2003, 18 pages.
European Search Report, dated Oct. 13, 2010, for EP 05849198.6, 10 pages.
Extended European Search Report, dated Apr. 4, 2022, for European Application No. 21198672.4, 10 pages.
Fourer et al., "Optimization as an Internet Resource," Interfaces 31(2): 130-150, Mar.-Apr. 2001.
Foxen et al., "Demonstrating a Continuous Set of Two-Qubit Gates for Near-Term Quantum Algorithms" Physical Review Letters 125, 120504 (2020), 6 pages.
Friedman et al., "Detection of a Schrodinger's Cat State in an rf-SQUID," arXiv:cond-mat/0004293 2:1-7, Apr. 19, 2000.
Grajcar et al., "Adiabatic quantum computation with flux qubits, first experimental results", arXiv, Feb. 25, 2007. https://arxiv.org/abs/cond-mat/0702580.
Grajcar et al., "Four-Qubit Device with Mixed Couplings", Physical Review Letters, Oct. 2, 2006. https://journals.aps.org/prl/abstract/10.1103/PhysRevLett.96.047006.
Groszkowski et al., "Tunable coupling between three qubits as a building block for a superconducting quantum computer", arXiv:1102.0307v2 [quant-ph], Oct. 20, 2011. https://arxiv.org/abs/1102.0307.
Gu et al., "Encoding Universal Computation in the Ground States of Ising Lattices", arXiv:1204.1084v2 [cond-mast.stat-mech], Jul. 17, 2012. https://arxiv.org/abs/1204.1084.
Born , et al., "Fabrication of Ultrasmall Tunnel Junctions by Electron Beam Direct-Writing", IEEE, 2001, 4 pages.
Inokuchi , "Analog Computation Using Quantum-Flux Parametron Devices," Physica C 357-360 :1618-1621, 2001.

(56) References Cited

OTHER PUBLICATIONS

Harrabi, et al. "Engineered selection rules for tunable coupling in a superconducting quantum circuit", Physical Reviews B 79, 020507(r) (2009), 4 pages.
Angelakis et al., "Many body effects and cluster state quantum computation in strongly interacting systems of photons," Quantum Information and Many Body Quantum Systems referred proceedings. Scuola Normale Superiore, CRM Series, vol. 5., 2008, pp. 1-10.
Astafiev et al., "Single-Shot Measurement of the Joseph Charge Qubit," Physical Review B 69(180507(R):1-4, 2004.
Averin et al., "Variable Electrostatic Transformer: Controllable Coupling of Two Charge Qubits," Physical Review Letters 91(5): 057003-1-057003-4, Aug. 1, 2003.
Averin, D.V., "Adiabatic Quantum Computation with Cooper Pairs," arXiv:quant-ph/9706026v1, Jun. 13, 1997, 18 pages.
Bartlett et al., "Simple Nearest-Neighbor Two-Body Hamiltonian System for Which the Ground State is a Universal Resource for Quantum Computation," Physical Review A 74:040302-1-040302-4, 2006.
Berkley et al., "Systems, Methods and Apparatus for Local Programming of Quantum Processor Elements," U.S. Appl. No. 11/950,276, filed Dec. 4, 2007, 31 pages.
Biamonte et al., "Physical Implementations for a Universal Quantum Computer and Related Coupling Devices," U.S. Appl. No. 60/910,445, filed Apr. 5, 2007, 63 pages.
Biamonte et al., "Physical Realizations of a Universal Adiabatic Quantum Computer," Notice of Allowance dated Jun. 18, 2015, for U.S. Appl. No. 13/539,039, 9 pages.
Biamonte et al., "Physical Realizations of a Universal Adiabatic Quantum Computer," Notice of Allowance dated Mar. 28, 2012, for U.S. Appl. No. 12/098,348, 8 pages.
Biamonte et al., "Physical Realizations of a Universal Adiabatic Quantum Computer," Office Action dated Mar. 16, 2012, for U.S. Appl. No. 12/098,348, 6 pages.
Biamonte et al., "Realizable Hamiltonians for Universal Adiabatic Quantum Computers," arXiv:0704.1287v1 [quant-ph], pp. 1-4, Apr. 10, 2007.
Biamonte et al., "Realizable Hamiltonians for Universal Adiabatic Quantum Computers," Physical Review A 78:012352, 2008, pp. 012352-1 through 012352-7.
Blais et al., Cavity Quantum Electrodynamics for Superconducting Electrical Circuits: an Architecture for Quantum Computation, Physical Review A 69(062320):1-14, 2004.
Blais et al., "Tunable Coupling of Superconducting Qubits," arXiv:cond-mat/0207112v3 [cond-mat.mes-hall], Mar. 18, 2003, 4 pages.
Blatter et al., "Design aspects of superconducting-phase quantum bits," Physical Review B 63: 174511-1-174511-9, 2001.
Blatter, G., "The Qubit Duet," Nature 421:796-797, Feb. 20, 2003.
Bocko et al., "Prospects for Quantum Coherent Computation Using Superconducting Electronics," IEEE Transactions on Applied Superconductivity, Jun. 1997, 5 pages.
Bravyi et al., "The Complexity of Stoquastic Local Hamiltonian Problems," arXiv:quant-ph/0606140v1, pp. 1-21, Jun. 16, 2006.
Butcher, J.R., "Advances in Persistent-Current Qubit Research: Inductively Coupled Qubits and Novel Biasing Methods," Final Report, Delft University of Technology, Jan. 14, 2002, 52 pages.
Choi, "Systems, Devices, and Methods for Analog Processing," U.S. Appl. No. 60/986,554, filed Nov. 8, 2007, 39 pages.
Choi, M-S., "Geometric Quantum Computation on Solid-State Qubits," arXiv:quant-ph/0111019v4, Sep. 29, 2003, 7 pages.
Corato et al., "Adiabatic Quantum Computation with Flux Qbits," Quantum Computing in Solid State Systems, pp. 103-110, 2006.
Cosmelli, C., "Controllable Flux Coupling for the Integration of Flux Qubits," arXiv:cond-mat/0403690v1 [cond-mat.supr-con]. Mar. 29, 2004, 10 pages.
Duty et al., "Coherent Dynamics of a Josephson Charge Qubit," Physical Review B 69(140503(R)):1-4, 2004.
Esteve et al., "Solid State Quantum Bit Circuits," arXiv:cond-mat/0505676 [cond-mat.supr-con], May 27, 2005, 37 pages.

European Search Report, dated Nov. 18, 2010, for EP 08733736.6, 12 pages.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," International Journal of Theoretical Physics 21(6/7): 467-488, 1982.
Friedman et al., "Aharonov-Casher-Effect Suppression of Macroscopic Tunneling of Magnetic Flux," arXiv:cond-mat/0109544v1 [cond-mat.mes-hall], Sep. 28, 2001, 9 pages.
Friedman et al., "Quantum superposition of distinct macroscopic states," Nature 406: 43-46, Jul. 6, 2000.
Grajcar et al., "Experimental Realization of Direct Josephson Coupling Between Superconducting Flux Qubits," arXiv:cond-mat/0501085v1, Jan. 5, 2005, 4 pages.
Grajcar et al., "Possible Implementation of Adiabatic Quantum Algorithm with Superconducting Flux Qubits," arXiv:cond-mat/0407405v3 [cond-mat.supr-con], Mar. 29, 2005, 8 pages.
Harris et al., "Probing Noise in Flux Qubits via Macroscopic Resonant Tunneling," arXiv:0712.0838v2 [cond-mat.mes-hall], Feb. 8, 2008, 4 pages.
Harris et al., "Sign and Magnitude Tunable Coupler for Superconducting Flux Qubits," arXiv:cond-mat/0608253 v1, Aug. 11, 2006.
Harris, "Systems, Devices, and Methods for Controllably Coupling Qubits," U.S. Appl. No. 12/017,995, filed Jan. 22, 2008, 33 pages.
Harris, "Systems, Methods and Apparatus for Anti-Symmetric Qubit-Coupling," U.S. Appl. No. 12/098,347, filed Apr. 4, 2008, 33 pages.
He et al., "Switchable Coupling Between Charge and Flux Qubits," arXiv:cond-mat/0703012v2 [cond-mat.supr-con], 5 pages, 2007.
Hime et al., "Solid-State Qubits with Current-Controlled Coupling," Science 314:1427-1429, 2006.
Hime et al., "Supporting Online Material for Solid-State Qubits with Current-Controlled Coupling," retrieved from http://www.sciencemag.org/cgi/content/full/314/5804/1427/DC1, 5 pages, Dec. 1, 2006.
Hutter et al., "Inductively Coupled Charge Qubits with Asymmetric SQUIDs," Jahrestagung der Deutschen Physikalischen Gesellschaft (DPG), 2005, 1 page—abstract only.
Il'ichev et al., "Continuous Monitoring of Rabi Oscillations in a Josephson Flux Qubit," Physical Review Letters 91(9):097906-1-097906-4, week ending Aug. 29, 2003.
Il'ichev et al., "Radio-Frequency Method for Investigation of Quantum Properties of Superconducting Structures," arXiv:cond-mat/0402559v3, Jun. 23, 2004, 10 pages.
Johansson et al., "Systems, Devices, and Methods for Controllably Coupling Qubits," U.S. Appl. No. 61/024,125, filed Jan. 28, 2008, 31 pages.
Johnson et al., "Systems, Devices, and Methods for Controllable Coupling Qubits," U.S. Appl. No. 60/915,657, filed May 2, 2007, 33 pages.
Kaminsky et al., "Scalable Superconducting Architecture for Adiabatic Quantum Computation," arXiv:quant-ph/0403090v1, Mar. 11, 2004, 5 pages.
Kim, "Controllable Coupling in Phase-Coupled Flux Qubits," Physical Review B 74:184501-1-184501-7, 2006.
Levitov, et al., "Quantum Spin Chains and Majorana States in Arrays of Coupled Qubits," arXiv:cond-mat/0108266v2 [cond-mat.mes-hall]. Aug. 19, 2001, 7 pages.
Maassen van den Brink et al., "Analog Processor Comprising Quantum Devices," U.S. Appl. No. 11/317,838, filed Dec. 22, 2005, 90 pages.
Maassen van den Brink et al., "Mediated tunable coupling of flux qubits," New Journal of Physics 7:1-18, 2005.
Han et al., "Time-Resolved Measurement of Dissipation-Induced Decoherence in a Josephson Junction," Science 293:1457-1459, Aug. 24, 2001.
Harris et al., "A Compound Josephson Junction Coupler for Flux Qubits with Minimal Crosstalk," arXiv:0904.37841 [cond-mat.supr-con] Apr. 24, 2009, 4 pages.
Harris et al., "Synchronization of Multiple Coupled rf-SQUID Flux Qubits", arXiv:0903.1884v1, Mar. 11, 2009. https://arxiv.org/abs/0903.1884.

(56) References Cited

OTHER PUBLICATIONS

Harris et al., "Experimental Demonstration of a Robust and Scalable Flux Qubit," arXiv:0909.4321v1, Sep. 24, 2009, 20 pages.
Harris et al., "Experimental Investigation of an Eight-Qubit Unit Cell in a Superconducting Optimization Processor," arXiv:1004.1628v2, Jun. 28, 2010, 16 pages.
He et al., "Generating multipartite entangled states of qubits distributed in different cavities", Quantum Informatoin Processing, vol. 13, No. 6, pp. 1381-1395 Feb. 11, 2014.
Hita-Perez et al., "Ultrastrong capacitive coupling of flux qubits", arXiv:2108.02549v1, Aug. 5, 2021. https://arxiv.org/abs/2108.02549.
Hormozi et al., "Nonstoquastic Hamiltonians and Quantum Annealing of an Ising Spin Glass," arXiv:1609.06558v2 [quant-ph], May 15, 2017, 9 pages.
Hu et al., "Decoherence and dephasing in spin-based solid state quantum computers", arXiv.org:cond-mat/0108339 (2001).
Hua et al., "Microstrip Bandpass Filters Using Dual-Mode Resonators with Internal Coupled Lines," Progress in Electromagnetics Research C, 21:99-111, 2011.
Hutter et al., "Parafermions in a Kagome lattice of qubits for topological quantum computation", Physical Review X, vol. 5, No. 4, Jun. 2, 2015.
Hutter et al., "Tunable Coupling of qubits: nonadiabatic corrections", arXiv:cond-mat/0602086v2, May 12, 2006. https://arxiv.org/abs/cond-mat/0602086.
International Search Report and Written Opinion for PCT/US2018/066613, dated Mar. 29, 2019, 24 pages.
Johansson et al., "Landau-Zener Transitions in an Adiabatic Quantum Computer", arXiv:0807.0797v1, Jul. 4, 2008. https://arxiv.org/abs/0807.0797.
Johnson et al., "Scalable Control System for a Superconducting Adiabatic Quantum Optimization Processor," Superconductor Science & Technology (2010).
Johnson et al., "What are the Least Tractable of Max Independent Set?", AT&T Labs, Oct. 24, 1998. https://dl.acm.org/doi/abs/10.5555/314500.315093?download=true.
Joyez et al., "Observation of Parity-Induced Suppression of Josephson Tunneling in the Superconducting Single Electron Transistor", hysical Review Letters, 72(15)12458 2461, (1994).
Kaiser et al., "Coherent Atomic Matter Waves: Proceedings of the Les Houches Summer School, Session LXXII in 1999," Springer-Verlag, New York, ISBN 286883499X, pp. 184-188, 294-295, 302-303.
Kempe et al., "The Complexity of the Local Hamiltonian Problem", arXiv:quant-ph/0406180, Jun. 24, 2004. https://arxiv.org/abs/quant-ph/0406180.
Kerman et al., "Quantum Enhanced Optimization: Experimental Study Overview", IARPA, Oct. 26, 2015.
Kim et al., "Coupling of Josephson Current Qubits Using a Connecting Loop," Physical Review B 70:184525-1-184525-6, 2004.
Koch et al., "Model for l/f Flux Noise in SQUIDs and Qubits," pp. 1-14, May 5, 2007.
Koval et al., "Narrow Long Josephson Junctions", IEEE, Jun. 1999. https://ieeexplore.ieee.org/document/783894.
Lang, "Analog was not a Computer Trademark!," Sound & Vibration:16-24, Aug. 2000.
Lanting et al., "Geometrical dependence of the low-frequency noise in superconducting flux qubits", Physical Review B, 79, 060509, Jun. 5, 2009, 4 pages.
Lantz et al., "Josephson Junction Qubit Network with Current-Controlled Interaction," Proceedings of the Fourth International Workshop on Macroscopic Quantum Coherence and Computing (MQC2'04), Jun. 7-10, 2004, 13 pages.
Lechner et al., "A quantum annealing architecture with all-to-all connectivity from local interactions", Science Advances. Oct. 23, 2015. https://advances.sciencemag.org/content/1/9/e1500838.
Leggett et al., "Dynamics of the dissipative tWo-state system", Reviews of Modern Physics, 59, pp. 1-85, 1987.

Leib et al., "A Transmon Quantum Annealer: Decomposing Many-Body Ising Constraints Into Pair Interactions", arXiv:1604.02359 [quant-ph], Apr. 8, 2016. https://arxiv.org/abs/1604.02359.
Levinson, "Principles of Lithography", The International Society for Optical Engineering, Bellingham, WA, 2001. (book details provided).
Lidar, "On the quantum computational complexity of the Ising spin glass partition function and of knot invariants," New Journal of Physics 6(167): 1-15, 2004.
Lykiardopoulou et al., "Improving nonstoquastic quantum annealing with spin-reversal transformations", Arxiv, Sep. 30, 2020.
Maassen van den Brink, "Galvanic coupling of flux qubits simple theory and tunability", Superconductivity (cond-mat.supr-con), May 16, 2006. https://arxiv.org/abs/cond-mat/0605398.
Madou, Fundamentals of Microfabrication, Second Edition, CRC Press LLC, Boca Raton, Florida, 2002. (book details provided) .
You et al., "Controllable Manipulation and Entanglement of Macroscopic Quantum States in Coupled Charge Qubits," Physical Review B 68:024510-1-024510-8, 2003.
You et al., "Fast Two-Bit Operations in Inductively Coupled Flux Qubits," arXiv:cond-mat/0309491 v1, pp. 1-5, Sep. 22, 2003.
Zagoskin et al., "Superconducting Qubits," La Physique au Canada 63(4):215-227, 2007.
Martinis et al., "Decoherence of a superconducting qubit due to bias noise", Physical Review B, Mar. 25, 2003. https://journals.aps.org/prb/abstract/10.1103/PhysRevB.67.094510.
Martinis et al., "Rabi Oscillations in a Large Josephson-Junction Qubit," Physical Review Letters 89(11):117901-1-117901-4, Sep. 9, 2002.
Martinis, "Superconducting phase qubits," Quantum Inf Process 8:81-103, 2009.
Zurek, "Decoherence and the transition from quantum to classical", Physics Today, 44, 10, pp. 36-44, 1991.
Murray et al., "Coupling Methods and Architectures for Information Processing," U.S. Appl. No. 11/247,857, filed Oct. 10, 2005, 73 pages.
Murray et al., "Coupling Schemes for Information Processing," U.S. Appl. No. 60/460,420, filed Dec. 30, 2004, 44 pages.
Nakamura et al., "Coherent control of macroscopic quantum states in a single-Cooper-pair-box," Nature 398:786-788, Apr. 29, 1999.
Neill, "A path towards quantum supremacy with superconducting qubits", PhD Thesis—University of California, Dec. 1, 2017.
Nielsen et al., "7.8 Other implementation schemes", Quantum Computing and Quantum Information, 2000. http://mmrc.amss.cas.cn/tlb/201702/W020170224608149940643.pdf.
Chinese Notice of Issuance dated Jun. 6, 2022 for Chinese Application No. 201680058686.7, 4 pages.
Nishimori et al., "Exponential enhancement of the efficiency of quantum annealing by non-stoquastic hamiltonians", arXiv:1609.03785 [quant-ph], Feb. 18, 2017. https://arxiv.org/abs/1609.03785.
Niskanen et al., "Quantum Coherent Tunable Coupling of Superconducting Qubits," Science 316:723-726, May 4, 2007.
Oliveria et al., "The complexity of quantum spin systems on a two-dimensional square lattice", arXiv:quant-ph/0504050, Aug. 1, 2008. https://arxiv.org/abs/quant-ph/0504050.
Paauw et al., "Spectroscopy on Two Coupled Superconducting Flux Qubits", Physical Review Letters, Mar. 9, 2005. https://journals.aps.org/prl/abstract/10.1103/PhysRevLett.94.090501.
Perdomo-Ortiz et al., "Opportunities and Challenges for Quantum-Assisted Machine Learning in Near-Term Quantum Computers," arXiv:1708.09757v1 [quant-ph]. Aug. 31, 2017, 14 pages.
Ramos et al., "Design for Effective Thermalization of Junctions for Quantum Coherence," IEEE Transactions on Applied Superconductivity 11(1):998-1001, Mar. 2001.
Rocchetto et al., "Stabilisers as a design tool for new forms of Lechner-Hauke-Zoller Annealer", arXiv:1603.08554 [quant-ph], May 2, 2016. https://arxiv.org/abs/1603.08554.
Sandberg et al., "Tuning the field in a microwave resonator faster than the photon lifetime", Applied Physics Letters, American Institute of Physics, vol. 92, No. 20, 3 pages, May 19, 2008.
Schaller et al., "The role of symmetries in adiabatic quantum algorithms", arXiv:0708.1882, Aug. 14, 2007. https://arxiv.org/abs/0708.1882.

(56) References Cited

OTHER PUBLICATIONS

Schützhold et al., "Adiabatic quantum algorithms and quantum phase transitions", arXiv:quant-ph/0608017, Aug. 1, 2006. https://arxiv.org/abs/quant-ph/0608017.
Shirts et al., "Computing: Screen Savers of the Word Unite!," Science Online 290(5498): 1903-1904, Dec. 8, 2000.
Shnirman et al., "Low-and High-Frequency Noise from Coherent two-Level Systems", Physical Review Letters, Apr. 1, 2005. https://arxiv.org/abs/cond-mat/0412668#:~:text=This%20implies%20a%20relation%20between,the%20parameters%20of%20the%20TLSs.
Steffen et al., "Quantum computing: an IBM perspective", IBM Journal of Research and Development, Sep./Oct. 2011.
Strauch, Theory of Superconducting Phase Qubits, UMI Microform, Ann Arbor, Michigan, 2005, Chapter 8, "Conclusion," pp. 298-306.
Tang et al., "2D implementation of quantum annealing algorisms for fourth order binary optimization problems", Institute for Quantum Computing and Department of Electrical and Computer Engineering, May 12, 2016.
Thom et al., "Coupling methods and architectures for information processing", U.S. Appl. No. 11/247,857, filed Oct. 10, 2005. https://patents.google.com/patent/US7619437B2/en?oq=US11%2f247%2c857.
Tokuda, "Analog Computation Using Single-Electron Circuits", Analog Integrated Circuits and Signal Processing, Oct. 1, 2000.
Van der Wal, C.H., "Quantum Superpositions of Persistent Josephson Currents," Thesis, Published by DUP Science, Sep. 24, 2001, 121 pages.
Van Zant, "Microchip Fabrication", Fourth Edition, McGraw-Hill, New York, 2000. (book details provided).
Vinci et al., "Non-stoquastic interactions in quantum annealing via the aharonov-anandan phase", arXiv:1701.07494 [quant-ph], Jan. 25, 2017.
Vion et al., "Manipulating the quantum state of an electrical circuit", Science, 296, pp. 886-889 (2002).
Wallraff, "Fluxon dynamics in annular Josephson junctions: from relativistic strings to quantum particles", Friedrich-Alexander University of Erlangen-Nürnberg, Apr. 1, 2001.
Wang et al., "Fast Entanglement of Two Charge-Phase Qubits Through Nonadiabatic Couling to a Large Josephson Junction," Physical Review B 70:224515-1-224515-4, 2004.
Weber et al., "Coherent Coupled Qubits for Quantum Annealing," arXiv:1701.06544v2 [quant-ph], Jun. 6, 2017, 14 pages.
Wei et al., "Preparation of multi-qubit W states in multiple resonators coupled by a superconducting qubit via adiabatic passage", Quantum Inf Process, Apr. 14, 2015.
Wei et al., "Quantum Computation with Josephson-Qubits by Using a Current-Biased Information Bus," arXiv:cond-mat/0407667 v1, pp. 1-13, Jul. 26, 2004.
Yamamoto et al., "Demonstration of conditional gate operation using superconducting charge qubits", Nature, Oct. 30, 2003. https://www.nature.com/articles/nature02015.
Yan et al., "A tunable coupling scheme for implementing high-fidelity two-qubit gates", Arxiv, Mar. 26, 2018.
Majer et al., "Spectroscopy on Two Coupled Superconducting Flux Qubits," Physical Review Letters 94:090501-1-090501-4, 2005.
Majer, J.B., "Superconducting Quantum Circuits," Thesis, published by DUP Science, Dec. 13, 2002, 120 pages.
Makhlin et al., "Quantum-state engineering with Josephson-junction devices," Reviews of Modern Physics 73(2):357-400, Apr. 2001.
Mooij et al., "Josephson Persistent-Current Qubit," Science 285: 1036-1039, Aug. 13, 1999.
Nielsen et al., Quantum Computation and Quantum Information, Cambridge University Press, Cambridge, 2000, "7.8 Other implementation schemes," pp. 343-345.
Niskanen et al., "Tunable Coupling Scheme for Flux Qubits at the Optimal Point," Physical Review B 73:094506-1-094506-8, 2006.
Orlando et al., "Superconducting persistent-current qubit," Physical Review B 60(22): 15 398-15 413, Dec. 1, 1999.
Pashkin et al., "Quantum Oscillations in Two Coupled Charge Qubits," Nature 421:823-826, Feb. 20, 2003.
Plourde et al., "Entangling Flux Qubits with a Bipolar Dynamic Inductance," arXiv:quant-ph/0406049v1, Jun. 8, 2004, 4 pages.
Quintana, "Superconducting Flux Qubits for High-Connectivity Quantum Annealing Without Lossy Dielectrics," Doctoral Thesis, UC Santa Barbara, 2017, 413 pages.
Rose et al., "Systems, Devices and Methods for Interconnected Processor Topology," U.S. Appl. No. 12/013,192, filed Jan. 11, 2008, 47 pages.
Rudo, "Influence of Strong Noise on the Adiabatic Quantum Computer," University of Vienna, 2015, 66 pages.
Shor, "Introduction to Quantum Algorithms," AT&T Labs—Research, arXiv:quant-ph/0005003 v2, pp. 1-17, Jul. 6, 2001.
Suzuki et al., "Quantum Annealing of the Random-Field Ising Model Transverse Ferromagnetic Interactions," arXiv:quant-ph/0702214v1, 6 pages, 2007.
Vala et al., "Encoded Universality for Generalized Anisotropic Exchange Hamiltonians," arXiv:quant-ph/0204016v1, Apr. 4, 2002, 15 pages.
Van Dam, "Quantum Computing in the 'Death Zone'?," Nature Physics 3:220-221, 2007.
Van der Ploeg et al., "Controllable Coupling of Superconducting Flux Qubits," Physical Review Letters 98:057004-1-057004-4, 2007.
Van der Ploeg, et al., "Adiabatic Quantum Computation with Flux Qubits, First Experimental Results," arXiv:cond-mat/0702580v1 [cond-mat.supr-con], Feb. 25, 2007, 6 pages.
Wallquist et al., "Superconducting Qubit Network with Controllable Nearest-Neighbor Coupling," New Journal of Physics 7(178), 24 pages, 2005.
Wallraff et al., "Strong Coupling of a Single Photon to a Superconducting Qubit Using Circuit Quantum Electrodynamics," Nature 431:162-167, Sep. 9, 2004.
Wendin et al., "Superconducting Quantum Circuits, Qubits and Computing," arXiv:cond-mat/0508729, 2005, 60 pages.
Wendin et al., "Superconducting Quantum Circuits, Qubits and Computing," arXiv:cond-mat/0508729v1 [cond-mat.supr-con], Aug. 30, 2005, 60 pages.
Wocjan et al., "Treating the Independent Set Problem by 2D Ising Interactions with Adiabatic Quantum Computing," arXiv:quant-ph/0302027v1, pp. 1-13, Feb. 4, 2003.
Wu et al., "Dressed Qubits," Physical Review Letters 91(9):1-4, Aug. 29, 2003.
Wu et al., "Qubits as Parafermions," arXiv:quant-ph/0109078v3, May 28, 2002, 17 pages.
Wu et al., "Universal Quantum Logic from Zeeman and Anisotropic Exchange Interactions," Physical Review A 66 (062314):1-5, 2002.
You et al., "Scalable Quantum Computing with Josephson Charge Qubits," Physical Review Letters 89(19):197902-1-197902-4, 2002.
Zagoskin et al., "Quantum Two-Level Systems in Josephson Junctions as Naturally Formed Qubits," Physical Review Letters 97:077001-1-077001-4, 2006.

\* cited by examiner

PHYSICAL REALIZATIONS OF A UNIVERSAL ADIABATIC QUANTUM COMPUTER

BACKGROUND

Field

This disclosure generally relates to physical implementations of universal adiabatic quantum computers, and specifically relates to qubit-coupling architectures for universal adiabatic quantum computer processors.

Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit.

The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. Nos. 6,838,694 and 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al., 1999, Science 285, 1036; and Orlando et al., 1999, *Phys. Rev. B* 60, 15398. Other examples of superconducting qubits can be found, for example, in Il'ichev et al., 2003, *Phys. Rev. Lett.* 91, 097906; Blatter et al., 2001, *Phys. Rev. B* 63, 174511; and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junction are well known in the art.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, and U.S. Provisional Patent Application Ser. No. 60/986,554 filed Nov. 8, 2007 and entitled "Systems, Devices and Methods for Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Effective Qubit

Throughout this specification and the appended claims, the terms "effective qubit" and "effective qubits" are used to denote a quantum system that may be represented as a two-level system. Those of skill in the relevant art will appreciate that two specific levels may be isolated from a multi-level quantum system and used as an effective qubit. Furthermore, the terms "effective qubit" and "effective qubits" are used to denote a quantum system comprising any number of devices that may be used to represent a single two-level system. For example, a plurality of individual qubits may be coupled together in such a way that the entire set, or a portion thereof, of coupled qubits represents a single two-level system.

Basis

Throughout this specification and the appended claims, the terms "basis" and "bases" are used to denote a set or sets, respectively, of linearly independent vectors that may be combined to completely describe a given vector space. For example, the basis of standard spatial Cartesian coordinates comprises three vectors, the x-axis, the y-axis, and the z-axis. Those of skill in mathematical physics will appreciate that bases may be defined for operator spaces, such as those used to describe Hamiltonians.

Commutation

In quantum mechanics, two operators or bases (A and B, for example) are said to "commute" if they obey the relation:

$$[A,B] = AB - BA = 0 \qquad (a)$$

Of particular interest are combinations of operators or bases that do not commute. That is, operators or bases (C and D, for example) for which:

$$[C,D]=CD-DC\neq 0 \qquad (b)$$

Throughout this specification and the appended claims, two bases "do not commute" if they follow the relation described in example (b) above.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use natural quantum fluctuations, such as quantum tunneling, to reach a global energy minimum more accurately or more quickly. It is known that the solution to a hard problem, such as a combinatorial optimization problem, may be encoded in the ground state of a system and therefore quantum annealing may be used to find the solution to such hard problems.

Adiabatic Quantum Computation

As mentioned previously, adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e=(1-s)H_i+sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. The coefficient s goes from 0 to 1, such that at the beginning of the evolution process the evolution Hamiltonian is equal to the initial Hamiltonian and at the end of the process the evolution Hamiltonian is equal to the final Hamiltonian. If the evolution is too fast, then the system can be excited to a higher state, such as the first excited state. In the present systems, methods, and apparatus, an "adiabatic" evolution is considered to be an evolution that satisfies the adiabatic condition, wherein the adiabatic condition is expressed as:

$$\dot{s}|\langle 1|dH_e/ds|0\rangle|=\delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally constant and slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Adiabatic quantum computation is a special case of quantum annealing for which the system begins and remains in its ground state throughout the evolution. Thus, those of skill in the art will appreciate that quantum annealing methods may generally be implemented on an adiabatic quantum computer, and vice versa. Throughout this specification, the term "adiabatic quantum computer" is used to describe a computing system that is designed to perform adiabatic quantum computations and/or quantum annealing.

Universal Adiabatic Quantum Computation

The concept of "universality" is understood in computer science to describe the scope or range of function of a computing system. A "universal computer" is generally considered to represent a computing system that can emulate any other computing system or, in other terms, a computing system that can be used for the same purposes as any other computing system. For the purposes of the present systems, methods and apparatus, the term "universal adiabatic quantum computer" is intended to describe an adiabatic quantum computing system that can simulate any unitary evolution.

BRIEF SUMMARY

At least one embodiment may be summarized as a quantum processor including a first set of qubits; a first set of coupling devices that are operable to selectively couple information from a first basis $A_1$ in a first qubit in the first set of qubits to a first basis $B_1$ in a second qubit in the first set of qubits thereby defining a first coupled basis $A_1B_1$; a second set of qubits; and a second set of coupling devices that are operable to selectively couple information from a second basis $A_2$ in a first qubit in the second set of qubits to a second basis $B_2$ in a second qubit in the second set of qubits thereby defining a second coupled basis $A_2B_2$, wherein at least one qubit in the first set of qubits is communicably coupled with at least one qubit in the second set of qubits, and wherein the first coupled basis $A_1B_1$ and the second coupled basis $A_2B_2$ do not commute.

The first coupled basis $A_1B_1$ may be a basis XX and the second coupled basis $A_2B_2$ may be a basis ZZ. The first coupled basis $A_1B_1$ may be a basis ZX and the second coupled basis $A_2B_2$ may be a basis XZ. The first set of qubits and the second set of qubits may at least partially overlap, such that at least one qubit may be simultaneously included in both the first and second sets of qubits. The quantum processor may further include a defined readout basis wherein at least one of the bases $A_1$, $B_1$, $A_2$, and $B_2$ is in a same basis as the readout basis. At least one of the qubits of the first set of qubits may be an effective qubit comprised of a plurality of individual qubits and individual couplers that couple the individual qubits to function effectively as a single qubit.

At least one embodiment may be summarized as a quantum processor including a plurality of qubits; a first programming interface that is communicably coupled to a Z-degree of freedom of at least one of the qubits; a second programming interface that is communicably coupled to an X-degree of freedom of at least one of the qubits; a first set of coupling devices, wherein each of the coupling devices in the first set of coupling devices is configured to communicably couple information between the Z-degree of freedom of at least two of the qubits; and a second set of coupling devices, wherein each of the coupling devices in the second set of coupling devices is configured to communicably couple information between the X-degree of freedom of at least two of the qubits.

The plurality of qubits may include a number of superconducting qubits. Each of the superconducting qubits may include a respective qubit loop formed by a closed superconducting current path and a respective compound Josephson junction that interrupts the qubit loop and is formed by a closed superconducting current path that is interrupted by at least two Josephson junctions, and wherein a first programming interface is communicably coupled to the qubit loop of at least one of the superconducting qubits and a second programming interface is communicably coupled to the compound Josephson junction of at least one of the superconducting qubits. Each of the coupling devices in the first set of coupling devices may be configured to couple magnetic flux signals between the qubit loops of a respective pair of the superconducting qubits. Each of the coupling devices in the second set of coupling devices may be configured to couple charge signals between a respective pair of the superconducting qubits. At least one of the qubits of the first set of qubits may be an effective qubit comprised of a plurality of individual qubits and individual couplers that couple the individual qubits to function effectively as a single qubit.

At least one embodiment may be summarized as a quantum processor including a plurality of qubits; a first programming interface that is communicably coupled to a Z-degree of freedom of at least one of the qubits; a second programming interface that is communicably coupled to an X-degree of freedom of at least one of the qubits; and a plurality of coupling devices, wherein each of the coupling devices is configured to communicably couple information between the Z-degree of freedom of a first one of the qubits and the X-degree of freedom of a second one of the qubits.

The plurality of qubits may include a number of superconducting qubits. Each of the superconducting qubits may include a respective qubit loop formed by a closed superconducting current path and a respective compound Josephson junction that interrupts the qubit loop and is formed by a closed superconducting current path that is interrupted by at least two Josephson junctions, and wherein a first programming interface is communicably coupled to the qubit loop of at least one of the superconducting qubits and a second programming interface is communicably coupled to the compound Josephson junction of at least one of the superconducting qubits. Each of the coupling devices may be configured to couple magnetic flux signals between the qubit loop of a first one of the superconducting qubits and the compound Josephson junction of a second one of the superconducting qubits. At least one of the qubits of the first set of qubits may be an effective qubit comprised of a plurality of individual qubits and individual couplers that couple the individual qubits to function effectively as a single qubit.

At least one embodiment may be summarized as a method of simulating coupling interactions between at least two effective qubits, including coupling information from a basis A in a first qubit to a basis B in a mediator qubit; and coupling information from the basis B in the mediator qubit to a basis C in a second qubit, thereby simulating AC coupling between the basis A in the first qubit and the basis C in the second qubit.

The coupling between the first qubit and the mediator qubit may be an XX coupling; the coupling between the mediator qubit and the second qubit may be a ZZ coupling; and the resulting simulated coupling may be an XZ coupling between the first and second qubits. The coupling between the first qubit and the mediator qubit may be an XZ coupling; the coupling between the mediator qubit and the second qubit may be a ZX coupling; and the resulting simulated coupling may be an XX coupling between the first and second qubits. The coupling between the first qubit and the mediator qubit may be a ZX coupling; the coupling between the mediator qubit and the second qubit may be an XZ coupling; and the resulting simulated coupling may be a ZZ coupling between the first and second qubits. Coupling information from a basis A in a first qubit to a basis B in a mediator qubit may include coupling the information from the basis A in the first qubit which is coupled to at least one other qubit to function effectively as a single effective qubit.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
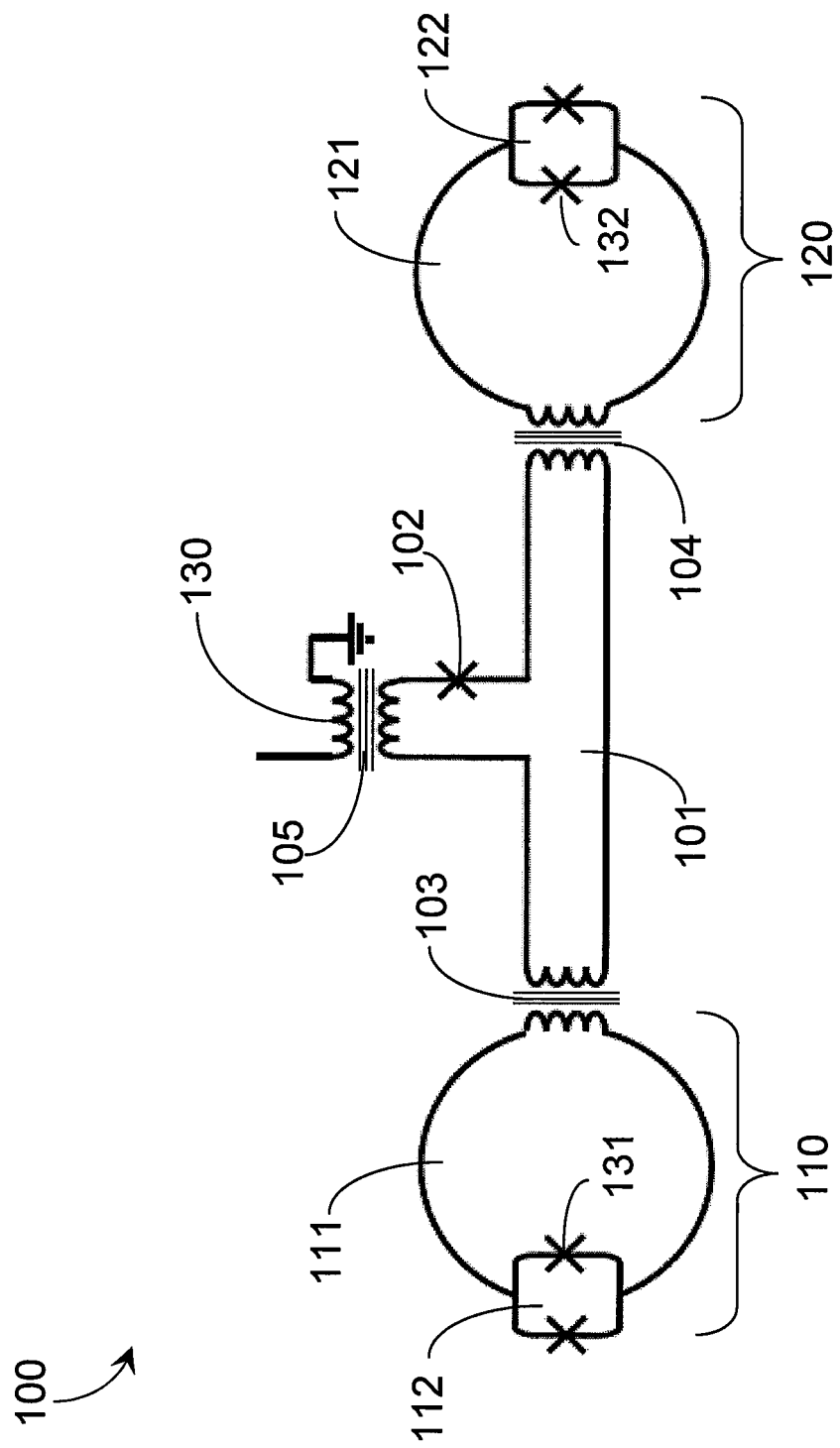
FIG. 1 shows a schematic diagram of a conventional controllable ZZ-coupler.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, such as quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described herein provide systems, methods and apparatus for universal adiabatic quantum computation. In accordance with the present systems, methods and apparatus, a universal adiabatic quantum computer processor comprises a plurality of qubits and qubit-coupling devices ("couplers") that are used to communicatively couple information between qubits. The architecture of the qubit-coupling (that is, which qubits are coupled together and in what way) influences the capabilities and performance of the quantum processor. In particular, the architecture of the qubit-coupling influences the Hamiltonians that may be realized by the quantum processor.

Adiabatic quantum computation may be implemented in a variety of different ways. Examples of particular implementations of adiabatic quantum computation are described in U.S. patent application Ser. No. 11/317,838 and Wocjan et al., 2003, "Treating the Independent Set Problem by 2D Ising Interactions with Adiabatic Quantum Computing," arXiv.org: quant-ph/0302027 (2003), pp. 1-13, where the qubit-coupling architecture is used to realize a 2-local Ising Hamiltonian with 1-local transverse field as given in equation 1:

$$H = \sum_{i=1}^{n} h_i \sigma_i^z + \sum_{i=1}^{n} \Delta_i \sigma_i^x + \sum_{i,j=1}^{n} J_{ij} \sigma_i^z \sigma_j^z \quad (1)$$

Here, n represents the number of qubits, $\sigma_i^z$ is the Pauli Z-matrix for the $i^{th}$ qubit, $\sigma_i^x$ is the Pauli X-matrix for the $i^{th}$ qubit, and $h_i$, $\Delta_i$ and $J_{i,j}$ are dimensionless local fields coupled to each qubit. The $h_i$ terms in equation 1 may be physically realized by coupling signals or fields to the Z-basis of each $i^{th}$ qubit. The $\Delta_i$ terms in equation 1 may be physically realized by coupling signals or fields to the X-basis of each $i^{th}$ qubit. The $J_{ij}$ terms in equation 1 may be physically realized by coupling the Z-bases of pairs of qubits (qubits i and j, respectively) together.

The behavior of superconducting qubits is typically controlled by a plurality of parameters or "degrees of freedom." These degrees of freedom may be programmed using a programming system, such as the programming systems described in U.S. patent application Ser. No. 11/950,276. Furthermore, these degrees of freedom provide means by or through which the superconducting qubits may interact with one another. A first qubit may interact with a second qubit by the coupling of information between a degree of freedom in the first qubit and a degree of freedom in the second qubit. The influence or effect of such an interaction depends on the type of information being coupled and the degrees of freedom that are involved.

As is understood in the art, each degree of freedom may correspond to a respective basis element defining the Hilbert space of a qubit. In the case of a superconducting flux qubit, the persistent current in the qubit loop is commonly associated with the Z-direction in the Hilbert space. Thus, a Z-Z (or "ZZ") interaction may be realized between two superconducting flux qubits by coupling information relating to the persistent current in the qubit loop of a first qubit to the qubit loop of a second qubit. Communicable coupling of the Z-degree of freedom of a pair of superconducting qubits may be realized by a superconducting ZZ-coupler, such as those described in Harris, R. et al., "Sign and Magnitude Tunable Coupler for Superconducting Flux Qubits", arXiv.org: cond-mat/0608253 (2006), pp. 1-5, and van der Brink, A. M. et al., "Mediated tunable coupling of flux qubits," New Journal of Physics 7 (2005) 230. A brief description of a conventional ZZ-coupling device is now provided.

FIG. 1 shows a schematic diagram of a conventional controllable ZZ-coupler 100. This coupler 100 is a loop of superconducting material 101 interrupted by a Josephson junction 102 and is used to couple a first qubit 110 and a second qubit 120 for use in a computer processor. First qubit 110 is comprised of a loop of superconducting material 111 interrupted by a compound Josephson junction 112 and is coupled to controllable coupler 100 through the exchange of flux 103 between coupler 100 and first qubit 110. Second qubit 120 is comprised of a loop of superconducting material 121 interrupted by a compound Josephson junction 122 and is coupled to controllable coupler 100 through the exchange of flux 104 between coupler 100 and second qubit 120. Loop of superconducting material 101 is threaded by flux 105 created by electrical current flowing through a magnetic flux inductor 130.

ZZ-coupler 100 couples information regarding the persistent current in the qubit loop 111 of qubit 110 to the persistent current in the qubit loop 121 of qubit 120, and vice versa. Thus, ZZ-coupler 100 couples information between the Z-degree of freedom in qubit 110 and the Z-degree of freedom in qubit 120.

Flux 105 produced by magnetic flux inductor 130 threads loop of superconducting material 101 and controls the state of controllable coupler 100. Controllable coupler 100 is capable of producing a zero coupling between first qubit 110 and second qubit 120, an anti-ferromagnetic coupling between first qubit 110 and second qubit 120, and a ferromagnetic coupling between first qubit 110 and second qubit 120.

Variations and, for some applications, improvements to the ZZ-coupler design shown in FIG. 1 are presented in U.S. patent application Ser. No. 12/017,995, and U.S. Provisional Patent Application Ser. No. 60/915,657, filed May 2, 2007 and entitled "Systems, Devices, and Methods for Controllably Coupling Qubits." Those of skill in that art will appreciate that the present systems, methods and apparatus teach qubit-coupling architectures for universal adiabatic quantum computation that may be implemented using a wide-variety of coupling devices including, but not limited to, the coupling devices described and/or referenced herein.

The Hamiltonian described in equation 1 may be implemented over a wide variety of adiabatic quantum computing applications; however, it was shown in S. Bravyi et al., "The Complexity of Stoquastic Local Hamiltonian Problems", arXiv.org:quant-ph/0606140 (2006), pp. 1-21 that this Hamiltonian cannot be used to construct a universal adiabatic quantum computer. Two Hamiltonians that can be used for universal adiabatic quantum computation are presented in Biamonte et al., "Realizable Hamiltonians for Universal Adiabatic Quantum Computation", arXiv.org:quant-ph/0704.1287 (2007), pp. 1-4. The present systems, methods and apparatus generally describe qubit-coupling architectures that may be used to physically realize these Hamiltonians. As an example, the present systems, methods and apparatus describe superconducting qubit-coupling architectures that may be used to physically realize these Hamiltonians with superconducting quantum processors.

The two Hamiltonians presented in Biamonte et al. are given in equations 2 and 3:

$$H = \sum_i^n h_i \sigma_i^z + \sum_i^n \Delta_i \sigma_i^x + \sum_{i,j}^n J_{ij} \sigma_i^z \sigma_j^z + \sum_{i,j}^n K_{ij} \sigma_i^x \sigma_j^x \quad (2)$$

$$H = \sum_i^n h_i \sigma_i^z + \sum_i^n \Delta_i \sigma_i^x + \sum_{i,j}^n J_{ij} \sigma_i^x \sigma_j^z + \sum_{i,j}^n K_{ij} \sigma_i^Z \sigma_j^x \quad (3)$$

where $K_{i,j}$ is a dimensionless local field coupled to each qubit (similar to $J_{i,j}$). In Biamonte et al., both of these Hamiltonians are proven to be QMA-complete and suitable for universal adiabatic quantum computation.

While the 2-local Ising Hamiltonian with 1-local transverse field given in equation 1 is known not to be universal, it can be made universal by adding a 2-local transverse $\sigma^x \sigma^x$ coupling term as in equation 2. As previously described, the persistent current in the qubit loop of a superconducting flux qubit is commonly associated with the Z-direction of the qubit's Hilbert space. On the other hand, the flux threading the CJJ of a superconducting flux qubit controls the qubit's tunnel splitting, which is commonly associated with the X-direction of the qubit's Hilbert space. In accordance with the present systems, methods and apparatus, a qubit-coupling architecture that is used to realize a 2-local Ising Hamiltonian with 1-local transverse field (equation 1) may be made universal by coupling information between the X-bases of qubits using an XX-coupler. Embodiments of superconducting XX-couplers are fully described in U.S. Provisional Patent Application Ser. No. 61/024,125, filed Jan. 28, 2008 and entitled "Systems, Devices, And Methods For Controllably Coupling Qubits." A description of exemplary XX-coupling devices is now provided.

Figure 2:
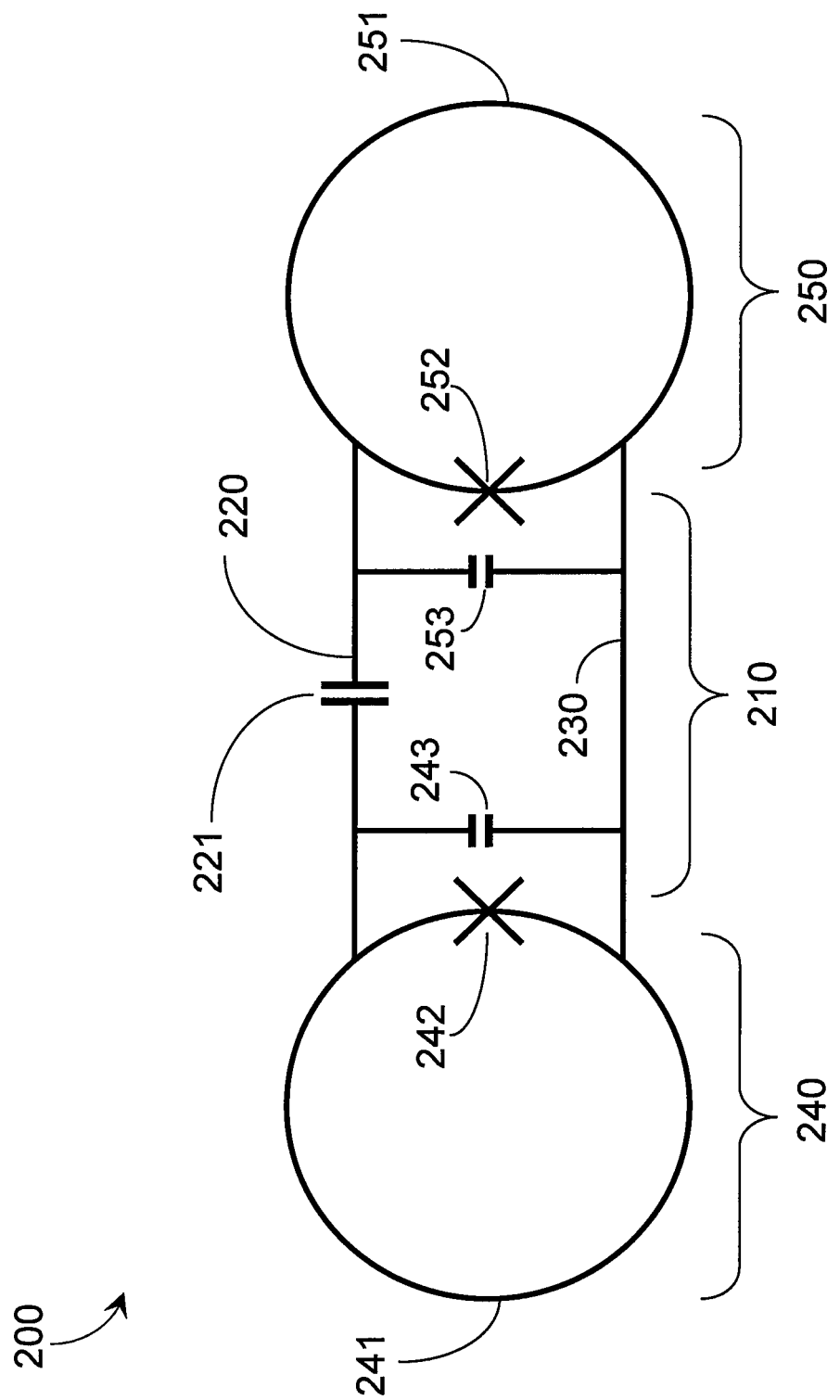
FIG. 2 is a schematic diagram of a system that includes a superconducting coupler capable of transverse XX-coupling between two superconducting qubits, according to one illustrated embodiment.

It was shown in Averin et al., Physical Review Letters 91, 057003 (2003) that tunable capacitive coupling can be used to couple information between superconducting qubits. FIG. 2 is a schematic diagram of a system 200 that includes a superconducting coupler 210 capable of providing transverse XX-coupling between a qubit 240 and a qubit 250 and is used to transversely couple qubit 240 and qubit 250. Qubit 240 may be comprised of a loop of superconducting material 241 interrupted by at least one Josephson junction 242 having an intrinsic capacitance graphically represented by a capacitor symbol 243. Qubit 250 may be comprised of a loop of superconducting material 251 interrupted by at least one Josephson junction 252 having an intrinsic capacitance graphically represented by a capacitor symbol 253. Qubit 240 and qubit 250 are connected by a conductive path 220 and a conductive path 230. The conductive paths 220, 230 may, for example, take the form of one or more wires or traces of material that is superconducting below a critical temperature, to form superconductive paths. Superconducting path 220 is interrupted by a coupling capacitor 221 having a capacitance of magnitude $C_c$.

It would be desirable if system 200 was tunable. By modifying system 200 to incorporate either a tunable inductance 311 and a capacitance 312, (as is shown in system 300 of FIG. 3) or a compound Josephson junction loop 415 (as is shown in system 400 of FIG. 4) a tunable transverse coupler may be achieved.

Figure 3:
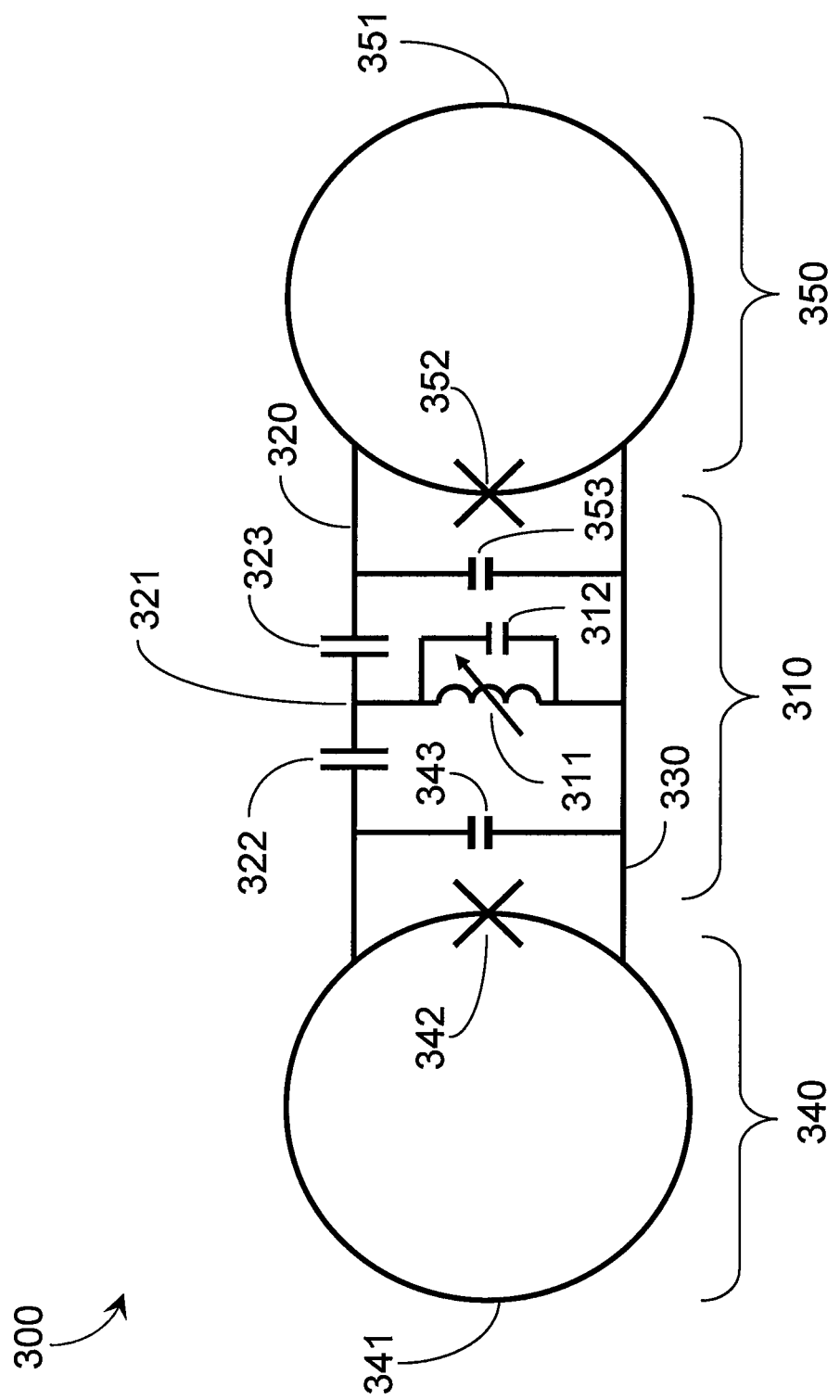
FIG. 3 is a schematic diagram of a system that includes a tunable superconducting coupler capable of tunable transverse XX-coupling between two superconducting qubits, according to one illustrated embodiment.

An exemplary embodiment of a tunable XX-coupler is shown in the schematic diagram of FIG. 3. A system 300 has a controllable transverse coupler 310 capable of providing transverse XX-coupling between a qubit 340 and a qubit 350 and is used to transversely couple qubit 340 and qubit 350. Qubit 340 may be comprised of a loop of superconducting material 341 interrupted by at least one Josephson junction 342 having an intrinsic capacitance graphically represented by a capacitor symbol 343. Qubit 350 may be comprised of a loop of superconducting material 351 interrupted by at least one Josephson junction 352 having an intrinsic capacitance graphically represented by a capacitor symbol 353. Qubit 340 and qubit 350 are connected by a conductive path 320 and a conductive path 330. The conductive paths 320, 330 may, for example, take the form of one or more wires or traces of material that are superconducting below a critical temperature, to form superconductive paths. Superconducting path 320 includes a coupling capacitance 322 and a coupling capacitance 323. The coupling capacitances 322, 323 may take the form of discrete capacitors. Alternatively, coupling capacitances 322, 323 may take the form of inherent, intrinsic or parasitic capacitances (commonly referred to as parasitic capacitance herein) associated with the first superconducting path 320. Tunable inductance 311 and capacitance 312 connect superconducting path 320, at a node 321 located between coupling capacitors 322, 323, to superconducting path 330. The tunable inductance 311 may, for example, be provided by a tunable or adjustable inductor.

The tunability of controllable transverse coupler 310 is achieved by adjusting the impedance shunting the path through coupling capacitors 322, 323. This is achieved by varying the tunable impedance 311.

Figure 4:
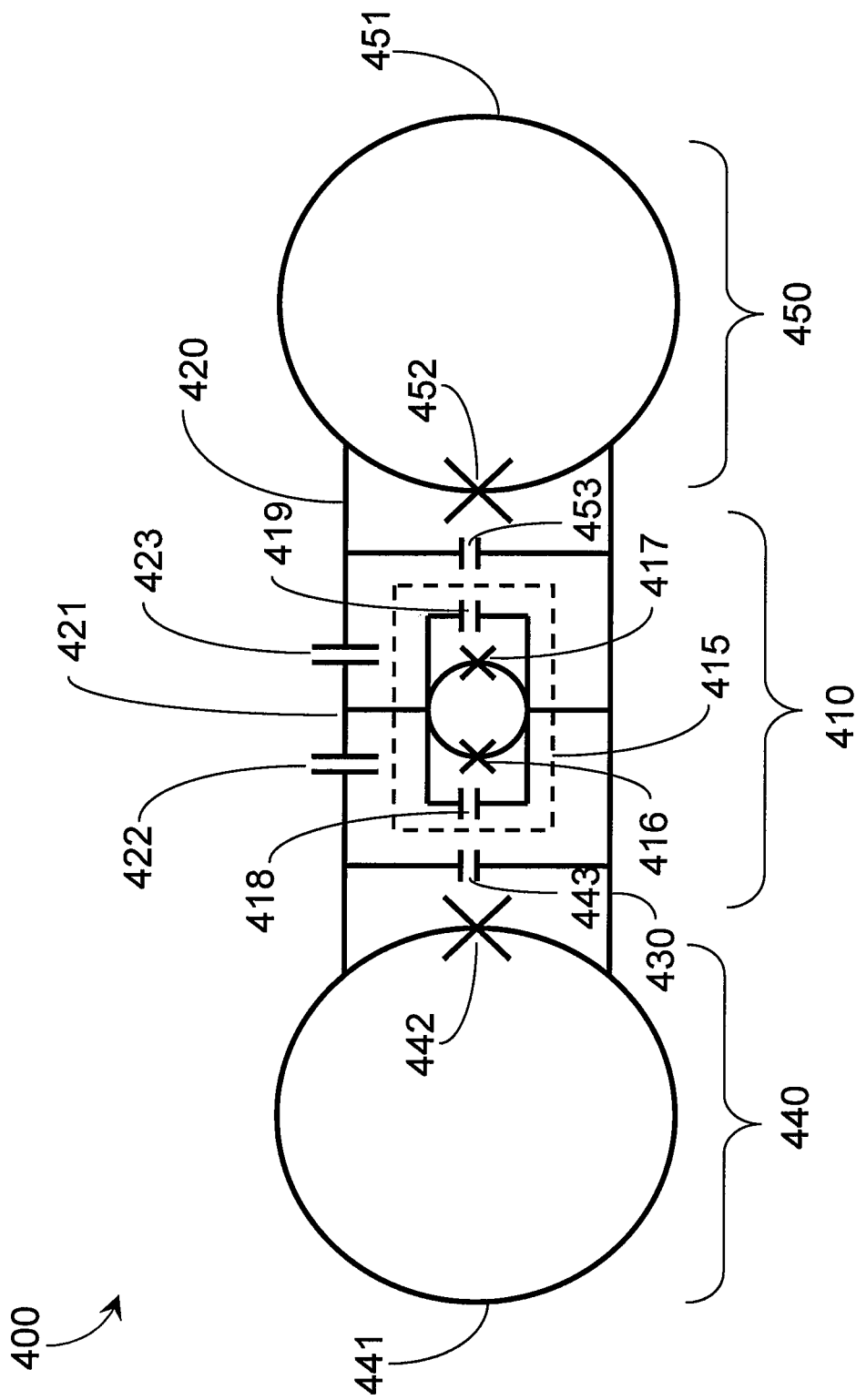
FIG. 4 is a schematic diagram of a system that includes a tunable superconducting coupler capable of tunable transverse XX-coupling between two superconducting qubits, according to another illustrated embodiment.

A further exemplary embodiment of a tunable XX-coupler is shown in the schematic diagram of FIG. 4. A system 400 includes a controllable superconducting coupler 410 capable of providing transverse XX-coupling between a qubit 440 and a qubit 450 and is used to transversely couple qubit 440 and qubit 450. Qubit 440 may be comprised of a loop of superconducting material 441 interrupted by at least one Josephson junction 442 having an intrinsic capacitance graphically represented by a capacitor symbol 443. Qubit 450 may be comprised of a loop of superconducting material 451 interrupted by at least one Josephson junction 452 having an intrinsic capacitance graphically represented by a capacitor symbol 453. Qubit 440 and qubit 450 are connected by a conductive path 420 and a conductive path 430. Conductive paths 420, 430 may, for example, take the form of one or more wires or traces of material that is superconducting below a critical temperature, to form superconductive paths. Superconducting path 420 includes a coupling capacitance 422 and a coupling capacitance 423. Coupling capacitances 422, 423 may take the form of discrete capacitors. Alternatively, coupling capacitances 422, 423 may take the form of inherent, intrinsic or parasitic capacitances associated with the first superconducting path 420. A compound Josephson junction loop 415, having a first Josephson junction 416 with an intrinsic capacitance graphically represented by a capacitor symbol 418 and a second Josephson junction 417 with an intrinsic capacitance graphically represented by a capacitor symbol 419, connects superconducting path 420, at a node 421 located between coupling capacitor 422 and coupling capacitor 423, to superconducting path 430. There may exist additional coupling capacitors along superconducting path 430. One coupling capacitor may be positioned along superconducting path 430 between qubit 440 and compound Josephson junction loop 415. There may be a voltage difference between the two leads of compound Josephson junction loop 415. Compound Josephson junction loop 415 may be seen as a shunt between superconducting paths 420, 430.

The tunability of tunable coupler 410 is achieved by adjusting the impedance shunting the path through coupling capacitors 422, 423. By changing the flux threading compound Josephson junction loop 415, the impedance shunting the path through coupling capacitors 422, 423 is changed. Therefore, by changing the amount of flux threading compound Josephson junction loop 415, the coupling strength is affected.

Figure 5:
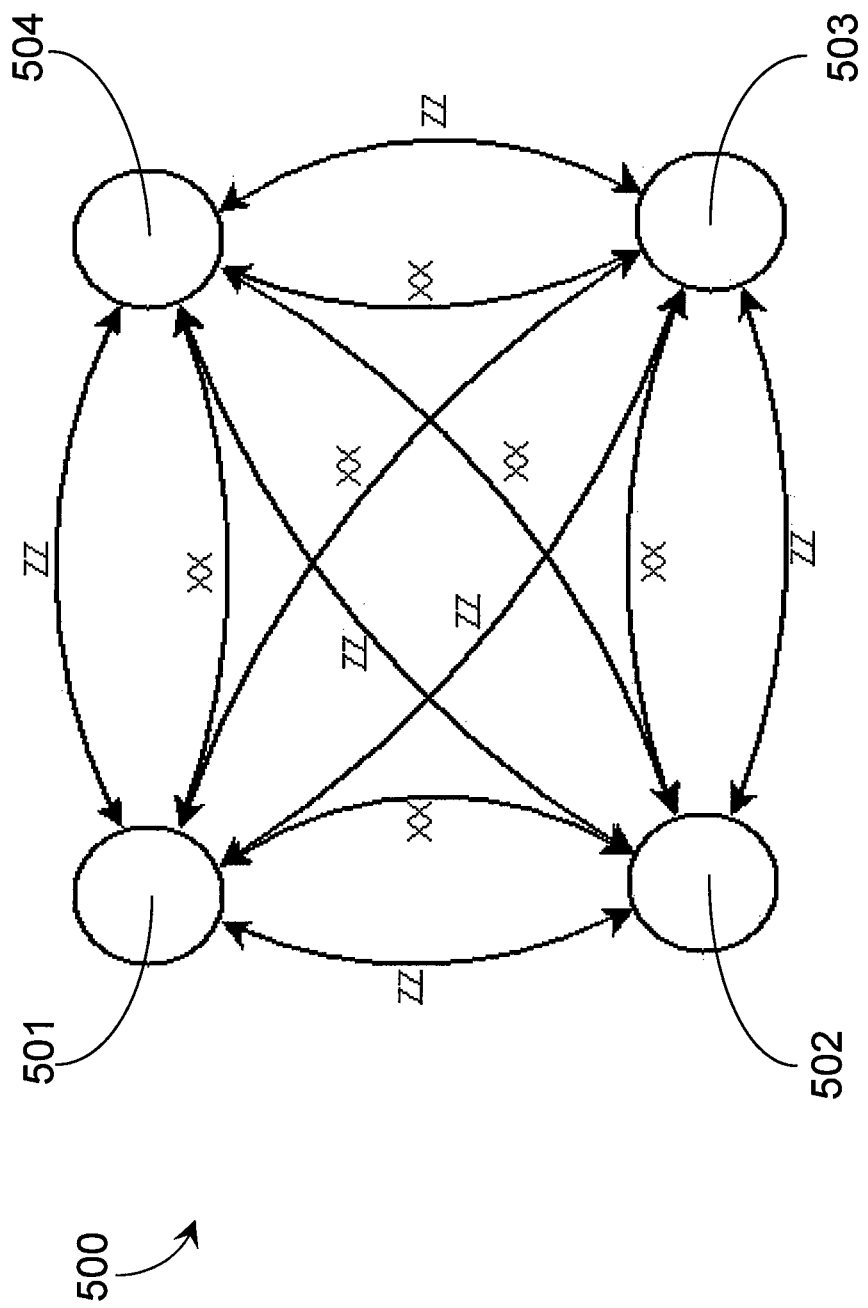
FIG. 5 is a functional diagram of an embodiment of a universal qubit-coupling architecture that incorporates ZZ- and XX-coupling, according to one illustrated embodiment.

In accordance with the present systems, methods and apparatus, the universal Hamiltonian described by equation 2 may be physically realized in a quantum processor with ZZ- and XX-coupling between qubits (in addition to coupling the $\sigma^z$ and $\sigma^x$ terms into each qubit). FIG. 5 is a functional diagram of an embodiment of a universal qubit-coupling architecture 500 that incorporates ZZ- and XX-coupling. Coupling architecture 500 shows four effective qubits 501-504, though those of skill in the relevant art will recognize that a similar coupling scheme may be applied to any number of qubits in a quantum processor. For instance, in an array or lattice of qubits, coupling architecture 500 would provide both XX- and ZZ-coupling between nearest and next-nearest neighboring pairs of effective qubits. In FIG. 5, the couplers are represented by solid lines joining two effective qubits and in each case the type of coupling ("XX" or "ZZ") is indicated next to the solid line. ZZ- and XX-couplers do not commute, that is, [ZZ,XX]≠0.

As previously stated, those of skill in the art will appreciate that a similar coupling architecture may be applied in a quantum processor involving a different number of qubits. However, it is recognized in U.S. patent application Ser. No. 12/013,192 that the operation of a single qubit device may be adversely affected if it is connected to too many couplers. In such instances, it is possible to combine two or more individual qubit devices as one effective qubit such that the desired number of couplers may be applied without adversely affecting the operation of the qubit devices.

The universal Hamiltonian described by equation 2 may be physically realized in a quantum processor by implementing the qubit-coupling architecture shown in FIG. 5. However, as previously indicated, it is also necessary to couple the $\sigma^z$ and $\sigma^x$ terms from equation 2 into each qubit. Techniques for coupling such signals into superconducting qubits are known in the art. A brief description of these techniques is now provided.

Figure 6:
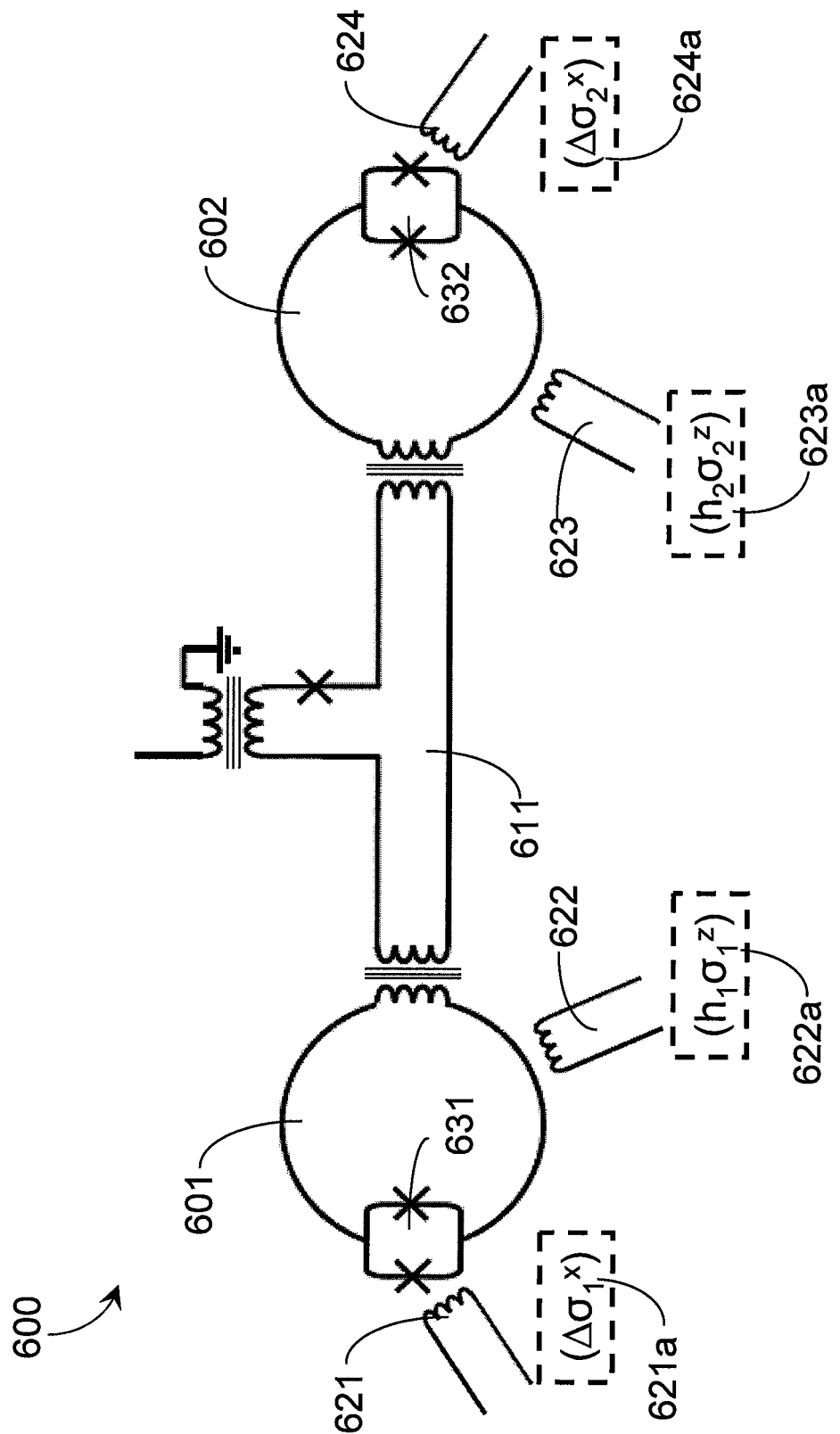
FIG. 6 is a schematic diagram of a portion of a conventional superconducting quantum processor designed for adiabatic quantum computation (and/or quantum annealing).

FIG. 6 is a schematic diagram of a portion of a conventional superconducting quantum processor 600 designed for adiabatic quantum computation (and/or quantum annealing). The portion of superconducting quantum processor 600 shown in FIG. 6 includes two superconducting qubits 601, 602 and a tunable ZZ-coupler 611 coupling information therebetween. While the portion of quantum processor 600 shown in FIG. 6 includes only two qubits 601, 602 and one coupler 611, those of skill in the art will appreciate that quantum processor 600 may include any number of qubits, and any number of coupling devices coupling information therebetween.

The portion of quantum processor 600 shown in FIG. 6 may be implemented to physically realize the Hamiltonian described by equation 1, which includes the same $\sigma^z$ and $\sigma^x$ terms as in the Hamiltonians described by equations 2 and 3. In order to provide these $\sigma^z$ and $\sigma^x$ terms, quantum processor 600 includes programming interfaces 621-624 that are used to configure and control the state of quantum processor 600. Each of programming interfaces 621-624 may be realized by a respective inductive coupling, as illustrated, to a programming system (not shown). Such a programming system may be separate from quantum processor 600, or it may be included locally (i.e., on-chip with quantum processor 600) as described in U.S. patent application Ser. No. 11/950,276.

In the programming of quantum processor 600, programming interfaces 621 and 624 may each be used to couple a flux signal into a respective compound Josephson junction 631, 632 of qubits 601 and 602, thereby realizing the $\Delta_i$ terms in the system Hamiltonian. This coupling provides the $\sigma^x$ terms of equations 1-3. Similarly, programming interfaces 622 and 623 may each be used to couple a flux signal into a respective qubit loop of qubits 601 and 602, thereby realizing the $h_i$ terms in the system Hamiltonian. This coupling provides the $\sigma^z$ terms of equations 1-3. In FIG. 1, the contribution of each of programming interfaces 621-624 to the system Hamiltonian is indicated in boxes 621a-624a, respectively.

Those of skill in the art will appreciate that the Hamiltonian described by equation 2 may be physically realized by coupling architectures that differ from coupling architecture 500 shown in FIG. 5. For instance, in some embodiments it may be appropriate to include XX-coupling between some qubits and ZZ-coupling between some qubits, but not necessarily both XX- and ZZ-coupling between every pair of coupled qubits. In some embodiments, it may be preferred to use only one type of coupling between any given pair of qubits, thereby providing a coupling architecture in which XX-coupling and ZZ-coupling are both present but never shared between the same pair of qubits.

In accordance with the present systems, methods and apparatus, quantum processor architectures that provide physical realizations of the universal Hamiltonian described by equation 2 have been described. However, in a further aspect of the present systems, methods and apparatus, quantum processor architectures that provide physical realizations of the universal Hamiltonian described by equation 3 are also described.

The universal Hamiltonian described by equation 3 includes the same $\sigma^z$ and $\sigma^x$ terms as described for equation 2, but substitutes $\sigma^z\sigma^x$ and $\sigma^x\sigma^z$ terms for the $\sigma^z\sigma^z$ and $\sigma^x\sigma^x$ terms of equation 2. In accordance with the present systems, methods and apparatus, the universal Hamiltonian that is described by equation 3 may be physically implemented by a qubit-coupling architecture that includes ZX- and XZ-coupling between qubits (in addition to coupling the $\sigma^z$ and of terms into each qubit). To this end, ZX- and XZ-couplers may be used. Descriptions of XZ- and ZX-couplers are provided in U.S. patent application Ser. No. 12/098,347, filed Apr. 4, 2008, and entitled "SYSTEMS, METHODS AND APPARATUS FOR ANTI-SYMMETRIC QUBIT- COUPLING". A description of exemplary XZ- and ZX-coupling devices is now provided.

Figure 7:
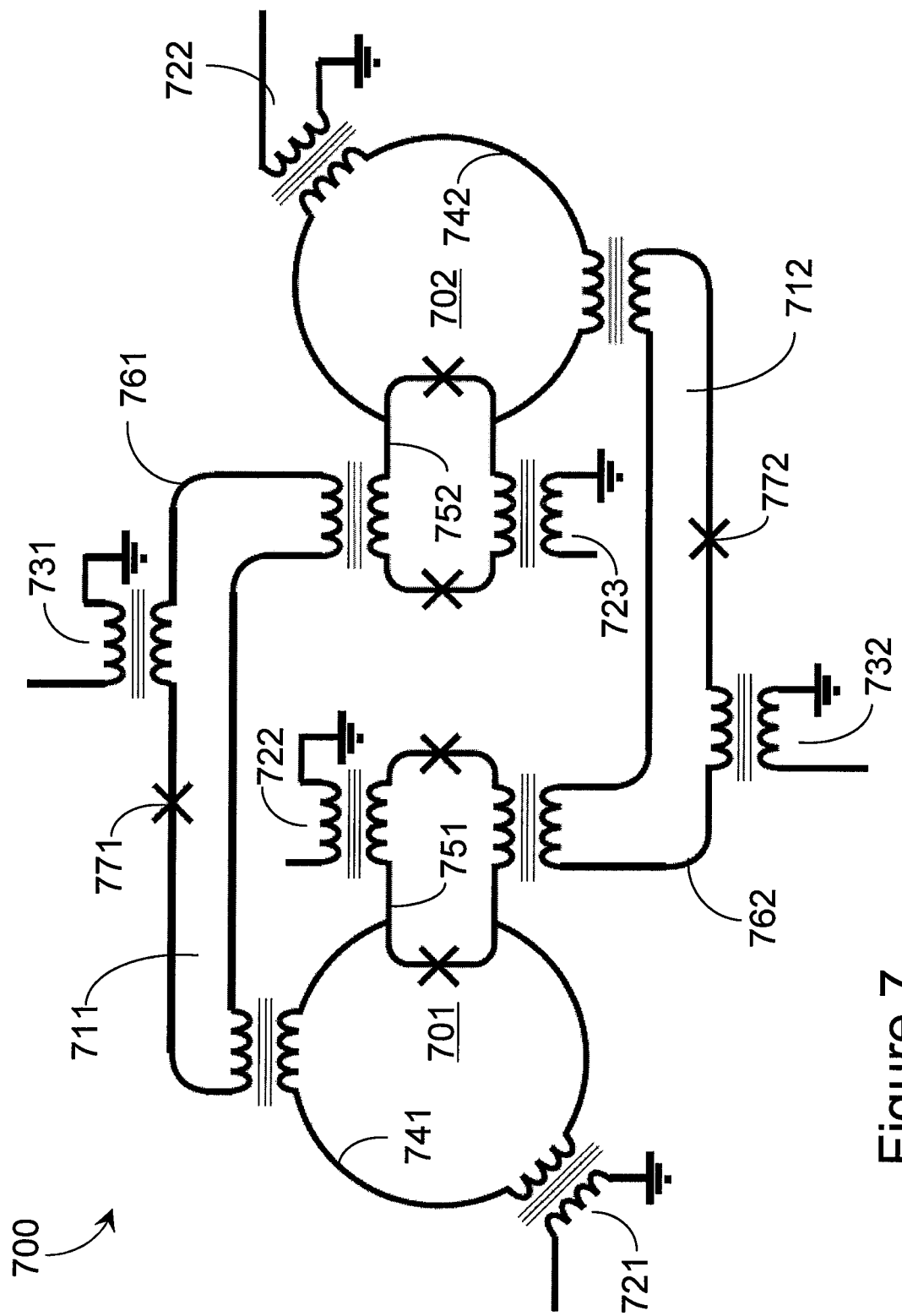
FIG. 7 is a schematic diagram of an embodiment of a system that includes two superconducting qubits and both a ZX-coupler and an XZ-coupler, each of which is configured to communicably couple information between the two qubits, according to one illustrated embodiment.

FIG. 7 is a schematic diagram of an embodiment of a system 700 that includes two superconducting qubits 701, 702 and both a ZX-coupler 711 and an XZ-coupler 712, each of which is configured to communicably couple information between qubits 701 and 702. Qubit 701 includes a qubit loop 741 formed by a closed superconducting current path that is interrupted by a compound Josephson junction 751. Similarly, qubit 702 includes a qubit loop 742 formed by a closed superconducting current path that is interrupted by a compound Josephson junction 752. Similar to portion of superconducting quantum processor 600 shown in FIG. 6, system 700 shown in FIG. 7 includes programming interfaces 721-724 which may be used to realize the $\sigma^z$ and $\sigma^x$ terms of the universal Hamiltonian described by equation 3. Each of programming interfaces 721-724 may be realized by a respective inductive coupling, as illustrated, to a programming system (not shown). Programming interfaces 721 and 724 may each be used to couple a flux signal into a respective compound Josephson junction 751, 752 of qubits 701 and 702, thereby realizing the $\Delta_i$ terms in the system Hamiltonian. This coupling provides the $\sigma^x$ terms of equation 3. Similarly, programming interfaces 722 and 723 may each be used to couple a flux signal into a respective qubit loop of qubits 701 and 702, thereby realizing the $h_i$ terms in the system Hamiltonian. This coupling provides the $\sigma^z$ terms of equation 3.

In accordance with the present systems, methods and apparatus, system 700 shown in FIG. 7 includes an exemplary embodiment of a ZX-coupler 711 and an exemplary embodiment of an XZ-coupler 712. ZX-coupler 711 includes a closed superconducting current path 761 that is inductively coupled to both the qubit loop 741 of qubit 701 and the compound Josephson junction 752 of qubit 702. Thus, ZX-coupler 711 provides coupling between the Z-degree of freedom in qubit 701 and the X-degree of freedom in qubit 702 by inductively coupling the persistent current in the qubit loop 741 of qubit 701 into the compound Josephson junction 752 of qubit 702. If qubit 701 is bi-stable, then the direction of persistent current flow in qubit loop 741 will influence the magnitude of the tunneling rate in the compound Josephson junction 752 of qubit 702.

In many applications, it is preferred to have "tunable" control over the coupling strength between qubits. In the case of ZX-coupler 711, tunability is realized by two tuning elements: closed superconducting current path 761 is interrupted by at least one Josephson junction 771 and closed superconducting current path 761 is inductively coupled to a programming interface 731. These tuning elements allow the susceptibility of ZX-coupler 711 to be tuned as described in A. Maassen van den Brink et al., New J. Phys. 7, 230 (2005).

Those of skill in the art will appreciate that the structure and operation of XZ-coupler 712 is effectively the "mirror-image" of the structure and operation of ZX-coupler 711. That is, XZ-coupler 712 includes a closed superconducting current path 762 that is inductively coupled to both the qubit loop 742 of qubit 702 and the compound Josephson junction 751 of qubit 701. Thus, XZ-coupler 712 provides coupling between the X-degree of freedom in qubit 701 and the Z-degree of freedom in qubit 702 by inductively coupling the persistent current in the qubit loop 742 of qubit 702 into the compound Josephson junction 751 of qubit 701. If qubit 702 is bi-stable, then the direction of persistent current flow in qubit loop 742 will influence the magnitude of the tunneling rate in the compound Josephson junction 751 of qubit 701. XZ-coupler 712 may also be made tunable by the combination of two tuning elements: closed superconducting current path 762 is interrupted by at least one Josephson junction 772 and closed superconducting current path 762 is inductively coupled to a programming interface 732.

Those of skill in the art will appreciate that the embodiments of ZX- and XZ-couplers shown in FIG. 7 are, for the purposes of the present systems, methods and apparatus, intended to serve as exemplary devices only and do not limit the scope of the present systems, methods and apparatus to implementations of XZ- and ZX-couplers exactly as drawn in FIG. 7.

Figure 8:
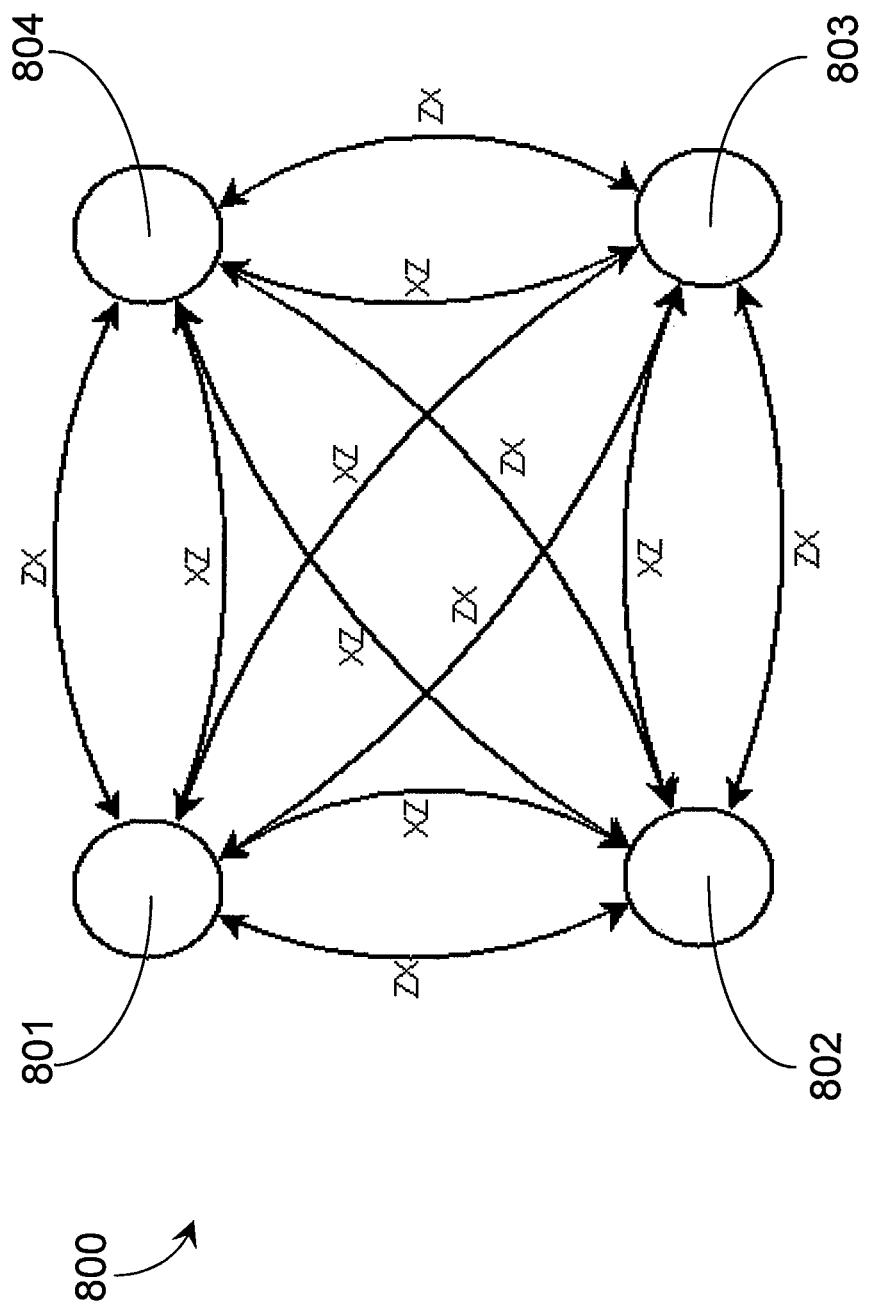
FIG. 8 is a functional diagram of an embodiment of a universal qubit-coupling architecture that incorporates XZ- and ZX-coupling, according to one illustrated embodiment.

In accordance with the present systems, methods and apparatus, the universal Hamiltonian described by equation 3 may be physically realized in a quantum processor with XZ- and ZX-coupling between qubits (in addition to coupling the $\sigma^z$ and $\sigma^x$ terms into each qubit). FIG. 8 is a functional diagram of an embodiment of a universal qubit-coupling architecture 800 that incorporates XZ- and ZX-coupling. Coupling architecture 800 shows four effective qubits 801-804, though those of skill in the relevant art will recognize that a similar coupling scheme may be applied to any number of qubits in a quantum processor. For instance, in an array or lattice of qubits, coupling architecture 800 would provide both XZ- and ZX-coupling between nearest and next-nearest neighboring pairs of effective qubits. In FIG. 8, the couplers are represented by solid lines joining two effective qubits and in each case the type of coupling ("XZ" or "ZX") is indicated next to the solid line. XZ- and ZX-couplers do not commute, that is, [XZ,ZX]≠0.

As previously stated, those of skill in the art will appreciate that a similar coupling architecture may be applied in a quantum processor involving a different number of qubits. However, it is recognized in U.S. patent application Ser. No. 12/013,192 that the operation of a single qubit device may be adversely affected if it is connected too many couplers. In such instances, it is possible to combine two or more individual qubit devices as one effective qubit such that the desired number of couplers may be applied without adversely affecting the operation of the qubit devices.

Furthermore, those of skill in the art will appreciate that the Hamiltonian described by equation 3 may be physically realized by coupling architectures that differ from coupling architecture 800 shown in FIG. 8. For instance, in some embodiments it may be appropriate to include XZ-coupling between some qubits and ZX-coupling between some qubits, but not necessarily both XZ- and ZX-coupling between every pair of coupled qubits. In some embodiments, it may be preferred to use only one type of coupling between any given pair of qubits, thereby providing a coupling architecture in which XZ-coupling and ZX-coupling are both present but never shared between the same pair of qubits.

A further aspect of the present systems, methods and apparatus is the use of a first set of non-commuting couplers to effectively simulate a second set of different couplers, which thereby confirms the universality of the first set of non-commuting couplers. For instance, a coupling scheme involving only XX- and ZZ-couplers may be used to simulate a coupling scheme involving XZ- and ZX-couplers, and vice versa. Such "coupler simulation" may be accomplished through "mediator qubits" which may be similar in structure to previously described qubits but may be used as intermediate coupling points between two or more effective qubits. Effectively, a mediator qubit may be used as a transition point between two types of couplers. Full details of such mediated qubit-coupling are described in Biamonte et al., a brief overview of which is now provided.

Figure 9:
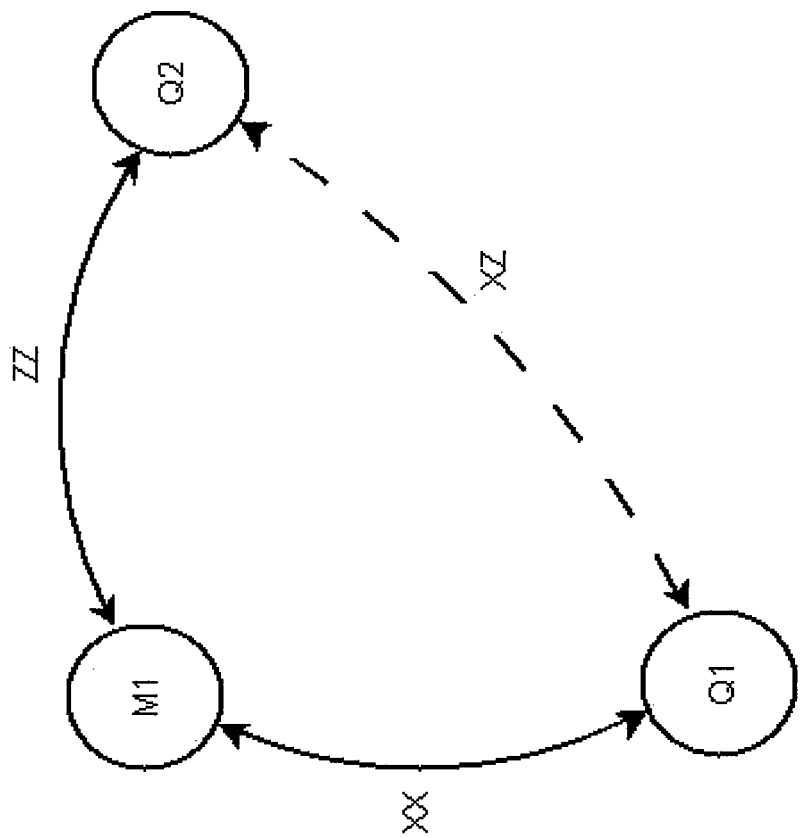
FIG. 9 is a functional diagram of a qubit system comprising two effective qubits and a mediator qubit, according to one illustrated embodiment.

FIG. 9 is a functional diagram of a qubit system 900 comprising two effective qubits, Q1 and Q2, and a mediator qubit M1. Actual couplings are physically implemented between Q1 and M1 and between M1 and Q2 in order to simulate an alternative coupling between Q1 and Q2. The actual couplings that are physically implemented between Q1 and M1 and between M1 and Q2 are represented by solid lines and the actual coupling type is indicated adjacent to each line. The effective coupling (as simulated by the actual mediated coupling) between the two effective qubits Q1 and Q2 is indicated by a dashed line with the effective coupling type indicated adjacent to the line. Thus, FIG. 9 is an embodiment showing how XX- and ZZ-couplers may be combined through a mediator qubit M1 to simulate XZ (and ZX) coupling. The simulated XZ coupling between Q1 and Q2 is accomplished by coupling XX from Q1 to M1 and ZZ from M1 to Q2. As shown in FIG. 9, an XX-coupler may combine with a ZZ-coupler through a mediator qubit M1 to simulate XZ coupling (or, alternatively, ZX coupling) between two effective qubits Q1 and Q2. FIG. 9 is an exemplary embodiment that uses two effective qubits Q1, Q2 and one mediator qubit M1; however, those of skill in the art will appreciate that the same principles may be applied to a system comprising any number of qubit devices.

Figure 10:
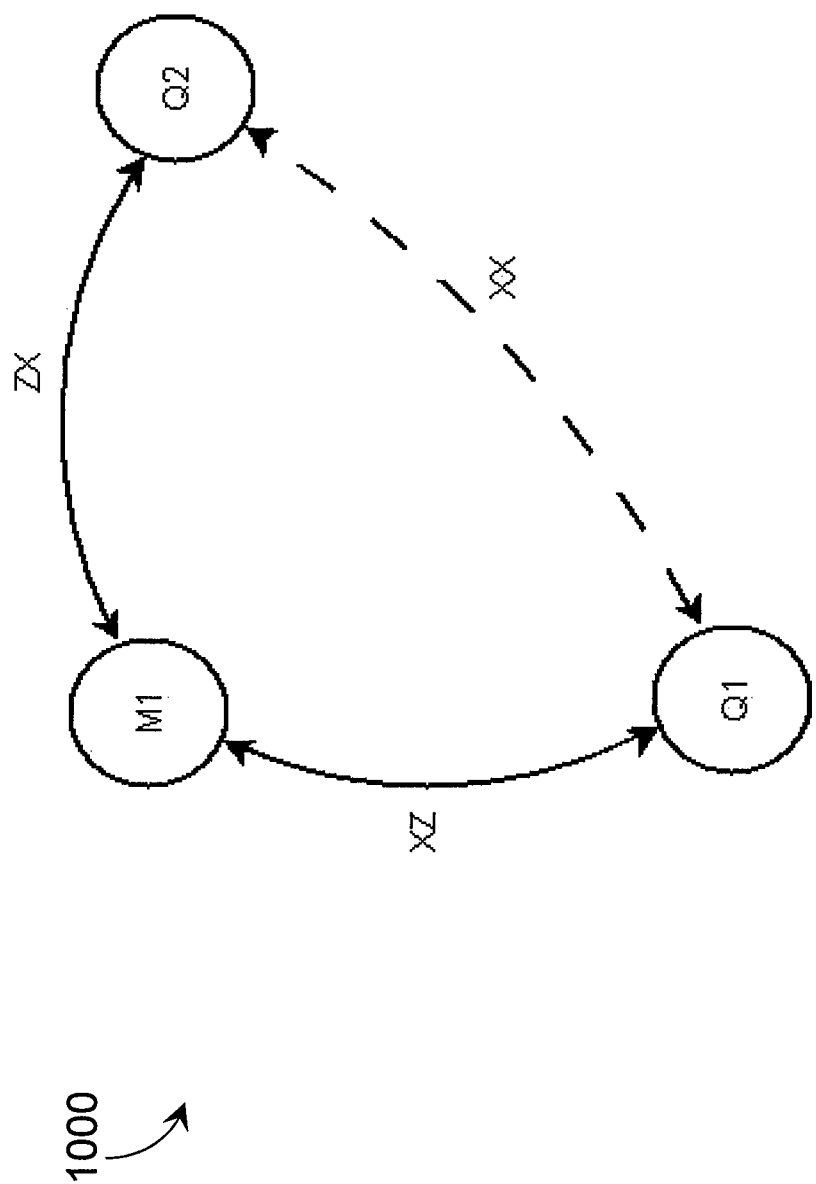
FIG. 10 is a functional diagram of another qubit system comprising two effective qubits and a mediator qubit, according to one illustrated embodiment.

Similarly, FIG. 10 is a functional diagram of a qubit system 1000 comprising two effective qubits Q1, Q2 and a mediator qubit M1. Actual couplings are physically implemented between Q1 and M1 and between M1 and Q2 in order to simulate an alternative coupling between Q1 and Q2. The actual couplings that are physically implemented between Q1 and M1 and between M1 and Q2 are represented by solid lines and the actual coupling type is indicated adjacent to each line. The effective coupling (as simulated by the actual mediated coupling) between the two effective qubits Q1, Q2 is indicated by a dashed line with the effective coupling type indicated adjacent to the line. Thus, FIG. 10 is an embodiment showing how XZ- and ZX-couplers may be combined through a mediator qubit M1 to simulate XX (or similarly ZZ) coupling. The simulated XX coupling between Q1 and Q2 is accomplished by coupling XZ from Q1 to M1 and ZX from M1 to Q2. As shown in FIG. 10, an XZ-coupler may combine with a ZX-coupler through a mediator qubit M1 to simulate XX coupling (or alternatively ZZ coupling) between two effective qubits Q1, Q2. FIG. 10 is an exemplary embodiment that uses two effective qubits Q1, Q2 and one mediator qubit M1; however, those of skill in the art will appreciate that the same principles may be applied to a system comprising any number of qubit devices.

The simulated coupling described in FIG. 9 and FIG. 10 allows multiple types of coupling to be realized by fewer actual coupler types. This can provide greater versatility in a quantum processor where the architecture is best-suited for specific types of couplers. For instance, a superconducting quantum processor that, for whatever reason, is best-suited to implement only ZZ-couplers and XX-couplers may incorporate simulated coupling through mediator qubits to realize the effects of simulated XZ and ZX coupling.

Those of skill in the art will appreciate that, for the purposes of realizing the qubit-coupling architectures taught in the present systems, methods and apparatus, the various embodiments of XX-, ZZ-, XZ-, and ZX-couplers described herein represent non-limiting examples of coupling devices. All of the coupling devices described in the present systems, methods and apparatus may be modified to accommodate the requirements of the specific system in which they are being implemented, or to provide a specific functionality that is advantageous in a particular application.

The present systems, methods and apparatus describe the physical realization of universal adiabatic quantum computation by the implementation of at least two different coupling mechanisms in one processor architecture. Each coupling mechanism provides coupling between a first and a second basis (for example, coupling between X and X, X and Z, or Z and Z), thereby defining a "coupled basis" (for example, XX, XZ, or ZZ). In accordance with the present systems, methods and apparatus, qubit-coupling architectures that each include at least two different coupled bases, where at least two different coupled bases do not commute, are used to realize the Hamiltonians for universal adiabatic quantum computation. For example, the various embodiments described herein teach that universal adiabatic quantum computation may be physically realized by the simultaneous application of off-diagonal couplers in a qubit-coupling architectures. Those of skill in the art will appreciate that this concept may extend to couplers that include the Y-basis, such as XY-, YX-, YY-, ZY-, and YZ-couplers.

This specification and the appended claims describe physical implementations of realizable Hamiltonians for universal adiabatic quantum computers by demonstrating universal qubit-coupling architectures. There is a common element to the embodiments of universal coupling schemes described herein, and that is the implementation of at least two different sets of coupling devices between qubits, where the respective bases coupled by the two different sets of coupling devices do not commute. Those of skill in the art will appreciate that such non-commuting couplers may be realized in a variety of different embodiments and implementations and all such embodiments cannot practically be disclosed in this specification. Thus, only two physical embodiments, the XX-ZZ coupling architecture and the XZ-ZX coupling architecture, are detailed herein with the recognition that anyone of skill in the relevant art will acknowledge the extension to any quantum processor architecture implementing non-commuting couplers. Furthermore, those of skill in the art will appreciate that certain quantum algorithms or hardware constraints may impose minimum requirements on the number of effective qubits in the quantum processor and/or the number of couplers. The present systems, methods and apparatus describe the use of XX and ZZ couplers to simulate XZ and ZX couplers, as well as the use of XZ and ZX couplers to simulate XX and ZZ couplers, thereby proving that a pair of non-commuting couplers in a quantum processor may be used to simulate other coupler schemes.

Throughout this specification, reference is occasionally made to "each qubit" in a quantum processor or a qubit-coupling architecture. Those of skill in the art will appreciate that the term "each" is used in a general sense, where in fact some embodiments may include a qubit or qubits that do not portray the specific feature or characteristic that is generally being described for "each" qubit.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of quantum computation, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 60/910,445, filed Apr. 5, 2007, and entitled "Physical Implementations for a Universal Quantum Computer and Related Coupling Devices", U.S. Pat. Nos. 6,838,694, 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", US Patent Publication No. 2006-0147154, U.S. patent application Ser. No. 12/017,995, U.S. Pat. No. 7,135,701, U.S. patent application Ser. No. 11/317,838, U.S. Provisional Patent Application Ser. No. 60/915,657, filed May 2, 2007 and entitled "Systems, Devices, and Methods for Controllably Coupling Qubits", U.S. Provisional Patent Application Ser. No. 61/024,125, filed Jan. 28, 2008 and entitled "Systems, Devices, And Methods For Controllably Coupling Qubits", U.S. patent application Ser. No. 11/950,276, U.S. patent application Ser. No. 12/098,347 filed Apr. 4, 2008 and entitled "SYSTEMS, METHODS AND APPARATUS FOR ANTI-SYMMETRIC QUBIT-COUPLING", U.S. patent application Ser. No. 12/098,348 filed Apr. 4, 2008 and U.S. patent application Ser. No. 13/539,039 filed Jun. 29, 2012, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operation of a quantum processor, the method comprising:
    forming a first coupled basis between a first pair of qubits of the quantum processor;
    forming a second coupled basis between a second pair of qubits of the quantum processor; and
    evolving the quantum processor, the quantum processor comprising the first pair of qubits, the first coupled basis, the second pair of qubits, and the second coupled basis, wherein the second coupled basis is non-commuting with the first coupled basis.

2. The method of claim 1, wherein a Hamiltonian of the quantum processor is a universal Hamiltonian, and the evolving the quantum processor includes performing a universal adiabatic quantum computation.

3. The method of claim 2, wherein:
    the forming a first coupled basis between a first pair of qubits of the quantum processor includes coupling information between a first basis in a first qubit of the first pair of qubits and a second basis in a second qubit of the first pair of qubits; and
    the forming a second coupled basis between a second pair of qubits of the quantum processor includes coupling information between a third basis in a third qubit of the second pair of qubits and a fourth basis in a fourth qubit of the second pair of qubits.

4. The method of claim 3, wherein:
    the coupling information between a first basis in a first qubit of the first pair of qubits and a second basis in a second qubit of the first pair of qubits includes coupling information between a basis X in the first and the second qubit of the first pair of qubit, the first coupled basis being an XX basis; and
    the coupling information between a third basis in third qubit of the second pair of qubits and a fourth basis in a fourth qubit of the second pair of qubits includes coupling information between a basis Z in the third and the fourth qubit of the first pair of qubits, the second coupled basis being a ZZ basis.

5. The method of claim 3, wherein:
    the coupling information between a first basis in a first qubit of the first pair of qubits and a second basis in a second qubit of the first pair of qubits includes coupling information between the basis X in the first qubit of the first pair of qubits and a basis Z in the second qubit of the first pair of qubits, the first coupled basis being an XZ basis; and
    the coupling information between a third basis in third qubit of the second pair of qubits and a fourth basis in a fourth qubit of the second pair of qubits includes coupling information between the basis Z in the third qubit of the first pair of qubits and the basis X in the fourth qubit of the second pair of qubits, the second coupled basis being a ZX basis.

6. The method of claim 3, wherein:
    the coupling information between a first basis in a first qubit of the first pair of qubits and a second basis in a second qubit of the first pair of qubits includes coupling information between a basis Y in the first and the second qubit of the first pair of qubit, the first coupled basis being an YY basis; and
    the coupling information between a third basis in third qubit of the second pair of qubits and a fourth basis in a fourth qubit of the second pair of qubits includes coupling information between a basis Z in the third and the fourth qubit of the first pair of qubits, the second coupled basis being a ZZ basis.

7. The method of claim 3, wherein:
    the coupling information between a first basis in a first qubit of the first pair of qubits and a second basis in a second qubit of the first pair of qubits includes coupling information between the basis Y in the first qubit of the first pair of qubits and a basis Z in the second qubit of the first pair of qubits, the first coupled basis being an YZ basis; and
    the coupling information between a third basis in third qubit of the second pair of qubits and a fourth basis in a fourth qubit of the second pair of qubits includes coupling information between the basis Z in the third qubit of the first pair of qubits and the basis Y in the fourth qubit of the second pair of qubits, the second coupled basis being a ZY basis.

8. The method of claim 3, wherein:
    the coupling information between a first basis in a first qubit of the first pair of qubits and a second basis in a second qubit of the first pair of qubits includes coupling information between a basis X in the first and the second qubit of the first pair of qubit, the first coupled basis being an XX basis; and the coupling information between a third basis in third qubit of the second pair of qubits and a fourth basis in a fourth qubit of the second pair of qubits includes coupling information between a basis Y in the third and the fourth qubit of the first pair of qubits, the second coupled basis being a YY basis.

9. The method of claim 3, wherein:

the coupling information between a first basis in a first qubit of the first pair of qubits and a second basis in a second qubit of the first pair of qubits includes coupling information between the basis X in the first qubit of the first pair of qubits and a basis Y in the second qubit of the first pair of qubits, the first coupled basis being an XY basis; and the coupling information between a third basis in third qubit of the second pair of qubits and a fourth basis in a fourth qubit of the second pair of qubits includes coupling information between the basis Y in the third qubit of the first pair of qubits and the basis X in the fourth qubit of the second pair of qubits, the second coupled basis being a YX basis.

10. The method of claim 2, wherein the performing a universal adiabatic quantum computation includes performing a universal adiabatic quantum computation, at least one qubit of the quantum processor being simultaneously included in the first and the second pair of qubits.

11. The method of claim 2, wherein the performing a universal adiabatic quantum computation includes simultaneously applying off-diagonal couplers.

12. The method of claim 1, wherein the evolving the quantum processor includes evolving the quantum processor from a known initial Hamiltonian to a final Hamiltonian by gradually changing the Hamiltonian.

13. The method of claim 1, wherein at least one of the qubits of the first and the second pair of qubits is an effective qubit comprised of a plurality of individual qubits and individual couplers that couple the individual qubits to function effectively as a single qubit.

14. The method of claim 1, wherein:

the forming a first coupled basis between a first pair of qubits of the quantum processor includes forming a first coupled basis between a first pair of superconducting flux qubits; and the forming a second coupled basis between a second pair of qubits of the quantum processor includes forming a second coupled basis between a second pair of superconducting flux qubits.

15. A method of operation of a quantum processor, the quantum processor comprising a plurality of qubits, the method comprising:

communicatively coupling a first programming interface to a Z-degree of freedom of a first qubit of the plurality of qubits;

communicatively coupling a second programming interface to an X-degree of freedom of a second qubit of the plurality of the qubits;

communicatively coupling, by a first coupling device, information between the Z-degree of freedom of a first pair of qubits of the plurality of qubits;

communicatively coupling, by a second coupling device, information between the X-degree of freedom of a second pair of qubits of the plurality of qubits;

programming the first qubit through the first programming interface;

programming the second qubit through the second programming interface; and evolving the quantum processor, wherein the evolving the quantum processor includes causing a first interaction between the first pair of qubits through the Z-degree of freedom and a second interaction between the second pair of qubits through the X-degree of freedom.

16. The method of claim 15, wherein:

the communicatively coupling a first programming interface to a Z-degree of freedom of a first qubit of the plurality of qubits includes communicatively coupling a first programming interface to a Z-degree of freedom of a first superconducting flux qubit of the plurality of qubits; and the communicatively coupling a first programming interface to an X-degree of freedom of a second qubit of the plurality of qubits includes communicatively coupling a second programming interface to an X-degree of freedom of a second superconducting flux qubit of the plurality of qubits.

17. The method of claim 16, wherein:

the communicatively coupling a first programming interface to a Z-degree of freedom of a first superconducting flux qubit of the plurality of qubits includes communicatively coupling, by the first programming interface, a flux signal into a qubit loop of the first superconducting flux qubit; and the communicatively coupling a second programming interface to an X-degree of freedom of a second superconducting flux qubit of the plurality of qubits includes communicatively coupling, by the second programming interface, a flux signal into a compound Josephson junction of the second superconducting flux qubit.

18. The method of claim 17, wherein the communicatively coupling, by a first coupling device, information between the Z-degree of freedom of a first pair of qubits of the plurality of qubits includes coupling magnetic flux signals between qubit loops of the first pair of qubits.

19. The method of claim 17, wherein the communicatively coupling, by a second coupling device, information between the X-degree of freedom of a second pair of qubits of the plurality of qubits includes coupling charge signals between qubit loops of the second pair of qubits.

20. The method of claim 15, wherein at least one of the qubits of the first and the second pair of qubits is an effective qubit comprised of a plurality of individual qubits and individual couplers that couple the individual qubits to function effectively as a single qubit.

* * * * *